(12) United States Patent
Yamamoto

(10) Patent No.: US 8,656,277 B2
(45) Date of Patent: *Feb. 18, 2014

(54) IMAGE PROCESSING APPARATUS, AND METHOD FOR CONTROLLING THE SAME

(75) Inventor: Masahito Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 170 days.

This patent is subject to a terminal disclaimer.

(21) Appl. No.: 13/181,354

(22) Filed: Jul. 12, 2011

(65) Prior Publication Data

US 2011/0267653 A1 Nov. 3, 2011

Related U.S. Application Data

(63) Continuation of application No. 12/270,669, filed on Nov. 13, 2008, now Pat. No. 7,992,083, which is a continuation of application No. 10/991,199, filed on Nov. 16, 2004, now Pat. No. 7,464,333.

(30) Foreign Application Priority Data

Nov. 20, 2003 (JP) ................. 2003-391118

(51) Int. Cl.
*G06F 17/00* (2006.01)
*G06F 3/048* (2013.01)
*G06F 3/12* (2006.01)

(52) U.S. Cl.
USPC ........... 715/273; 15/234; 15/246; 15/808; 709/203; 709/219; 358/1.1

(58) Field of Classification Search
USPC ......... 715/200, 204, 234, 238, 239, 243, 251, 715/273, 274, 276, 700, 705, 713, 715, 746, 715/760, 762, 807, 808, 831, FOR. 197, 715/FOR. 253, FOR. 264; 709/201, 203, 709/217, 219; 358/1.1, 1.15, 1.2, 1.9, 3.12, 358/528

See application file for complete search history.

(56) References Cited

U.S. PATENT DOCUMENTS

| 6,522,421 | B2 * | 2/2003 | Chapman et al. | 358/1.15 |
|---|---|---|---|---|
| 6,580,966 | B2 * | 6/2003 | Shimada | 700/223 |
| 6,587,861 | B2 * | 7/2003 | Wakai et al. | 715/209 |
| 6,665,724 | B2 * | 12/2003 | Lawrence | 709/230 |
| 6,747,753 | B1 * | 6/2004 | Yamamoto | 358/1.15 |
| 6,791,703 | B1 * | 9/2004 | Maeda et al. | 358/1.15 |
| 6,885,406 | B2 * | 4/2005 | Yui et al. | 348/564 |
| 7,171,468 | B2 * | 1/2007 | Yeung et al. | 709/225 |
| 7,209,965 | B2 * | 4/2007 | Sato | 709/224 |
| 7,259,883 | B2 * | 8/2007 | Yamamoto | 358/1.15 |
| 7,272,647 | B2 * | 9/2007 | Haraguchi et al. | 709/224 |
| 2001/0034747 | A1 * | 10/2001 | Fujitani et al. | 707/525 |
| 2002/0065871 | A1 * | 5/2002 | Wakai et al. | 709/202 |
| 2002/0154328 | A1 * | 10/2002 | Sato | 358/1.13 |
| 2003/0016387 | A1 * | 1/2003 | Takagi et al. | 358/1.15 |
| 2003/0123079 | A1 * | 7/2003 | Yamaguchi et al. | 358/1.15 |

* cited by examiner

*Primary Examiner* — Maikhanh Nguyen

(74) *Attorney, Agent, or Firm* — Canon USA Inc. IP Division

(57) ABSTRACT

An information processing apparatus fully utilizing contents available on a network by processing content that cannot be displayed on a built-in browser. A web browser displays in a pop-up fashion a dialog window that queries a user about the process to be performed on undisplayable data if the received data is undisplayable. The user can select between "print" and "send" as an alternative process for the undisplayable data.

18 Claims, 20 Drawing Sheets

FIG. 11

```
1   <html>
2   <head><title>Manual</title></head>
3   <body>
4   <h1>Manual</h1>
5   <p>
6   Product manual is available in PDF file
7   </p>
8   <ul>
9   <li><a href = "user-manual.pdf">user manual</a><li>
10  <li><a href = "program-manual.pdf">programmer's manual</a><li>
11  </ul>
12  </body>
13  </html>
```

FIG. 14

"user-manual.pdf" cannot be displayed

Type: application/pdf
Location:http://canon.jp/support/document/user-manual.pdf select one of the following options.

( print )    ( send )    ( cancel )

IMAGE PROCESSING APPARATUS, AND METHOD FOR CONTROLLING THE SAME

CROSS REFERENCE TO RELATED APPLICATIONS

This application is a Continuation of U.S. patent application Ser. No. 12/270,669 filed Nov. 13, 2008, now issued as U.S. Pat. No. 7,992,083, which is a continuation of U.S. patent application Ser. No. 10/991,199 filed Nov. 16, 2004, now issued as U.S. Pat. No. 7,464,333, which claims priority from Japanese Patent Application No. 2003-391118 filed Nov. 20, 2003, of which the entire contents of all are hereby incorporated by reference herein.

BACKGROUND OF THE INVENTION

1. Field of the Invention

The present invention relates to an image processing apparatus, and a method for controlling the image processing apparatus.

2. Description of the Related Art

Web servers provide hypertext markup language (HTML) documents transmitted using hypertext transmission protocol (HTTP). Web browsers, as a client, display HTML documents acquired from the web server using HTTP. The web servers and the web browsers contribute to the widespread use of the Internet. The technology of the Internet in turn contributes to the advance of intranets that provide in-house information environments.

The web servers supply content via the Internet and intranets in a variety of formats other than HTML. For example, documents, such as manuals, have been conventionally distributed in printed matter, but today, a web server can supply the documents in electronic data (such as portable document file (PDF) data). Since HTTP transfers data in a binary stream, a web server can hold and supply data in a variety of types of data protocols as necessary. Content provided using new data protocols is expected to emerge.

A web browser, as a client, acquires data in any format using HTTP, but cannot display the data if a module compatible with the format is not built in. To respond to content in a variety of data formats, many web browsers for use in desktop computers have mechanisms called plug-ins and helpers. Content that the web browser is not able to process is displayed using software modules and applications, such as plug-in and helpers. When neither browser nor plug-in can display received content, the browser opens and displays the data using a helper application, or simply stores the acquired data in an external storage device without displaying the data.

As mobile terminals, such as cellular phones and personal digital assistants (PDAs), become sophisticated, many of the terminals contain built-in browsers. Users always carry the terminals, like a wearable computer, accessing the Internet or intranet to use resources thereof in a ubiquitous computing environment. Built-in user interfaces in the mobile terminals are typically subject to limitation in display resolution and display area size. Information throughput of the terminals is also restrained. With these limitations, the web browser built into the terminal has difficulty in achieving a performance level as high as that of a desk-top computer web browser.

Japanese Patent Laid-Open No. 2001-344435 discloses a network system, in which a terminal is combined with a public printer installed like an automatic vending machine. The browser of the terminal accesses a content server to select content and an output printer. The mobile terminal can thus print out a high-resolution undisplayable content of a large amount of information on the output printer anywhere at any time.

Distribution systems realizing ubiquitous computing and including "carry-always" type terminals having built-in web browsers and printers have been proposed. For example, a server provides a low-quality image for a browser and a high-quality image for a printer (Japanese Patents Laid-Open Nos. 2001-256025 and 2001-259098).

Some digital multi-function apparatuses provide a web pullprint function (Japanese Patents Laid-Open Nos. 11-134125, 11-212751, 11-327834, and 2000-194531). The web pullprint function presents a data acquisition mechanism in HTTP like the one provided by the web browser, and a rendering mechanism for HTML. With the web pullprint function, an apparatus acquires content from a uniform resource locator (URL) designated by a user and prints out the acquired content.

A variety of content in formats other than HTML are currently present in the Internet or intranets. A dedicated and built-in browser in terminals, typically outperformed in throughput and expandability by general-purpose computers such as personal computers, has difficulty working with all types of data formats. The browser, typically installed as firmware, lacks flexibility such as working with additional function of a plug-in or helper.

Likewise, a web browser built into an image input and output processing apparatus, such as a multi-function apparatus, acquires data using HTTP, but can not necessarily interpret and expand data. The multi-function apparatus is provided with excellent functions as a dedicated apparatus, such as printing and facsimile transmission. With dedicated functions, the multi-purpose apparatus works with a variety of data types required in the functions. The data of a type that the built-in browser cannot display can be handled if the dedicated function of the apparatus is used. For example, a printer function typically handles many page description languages (PDLs) and image types. A printer having a direct print function prints PDF data and data unique to various applications. An image sending function converts data in many types of images, compression method, and file format into various types of image data before transmission, as necessary. As for a particular data format corresponding to the feature of these functions, the data protocols/formats handled by the apparatus's original function are diverse in comparison with the data protocols/formats handled by the built-in browser.

The user carrying a known mobile terminal browses resources scattered over a network, finds desired data, and prints out the desired data. However, in a workflow where sheets of paper, such as original documents, and transfer sheets, are input or output, users must be present in front of an apparatus to handle sheets of paper. It is frequently convenient for users to browse network resources on the user interface of the apparatus, and search for desired data. If a general-purpose web server maintains a dedicated content server that stores low-quality content intended to be displayed on a low-end browser and high-quality content intended to be printed, maintenance costs become substantially large. An HTML document, as an index, through which undisplayable data is referenced (linked), describes a location of data (URL), and does not include a description of data. A request to acquire the data is issued via HTTP, and whether or not the data is displayable is known by the head of an HTTP reply returned in response to the request. If the browser has determined that data is not displayable, it is not efficient for a printer to acquire the data.

In a known web pullprint, a built-in web pullprint module prints renderable data such HTML. Since the web pullprint is subject to limitations to throughput and expandability as much as a built-in browser, the web pullprint cannot handle a diversity of data.

SUMMARY OF THE INVENTION

Accordingly, the present invention provides an improved image processing apparatus and a control method for controlling the image processing apparatus.

The image processing apparatus and control method for controlling the image processing apparatus appropriately process data received from a server even if the received data is undisplayable.

The image processing apparatus and control method for controlling the image processing apparatus select one of a plurality of processes executable for the data received from the server, and perform the selected process on the data under a set process condition.

According to one aspect of the present invention, an image processing apparatus communicating with a server on a network includes: an input unit configured to input identification information that identifies data in the server; a receiver unit configured to receive, from the server, the data identified by the identification information; a display unit configured to display the data received by the receiver unit; a determining unit configured to determine whether the data received by the receiving unit is undisplayable data that cannot be displayed by the display unit; a selector unit configured to select one of a plurality of processes to be performed on the data if the determining unit determines that the data is undisplayable data; and a control unit configured to control the executing of the process, selected by the selector unit, on the undisplayable data.

According to another aspect of the present invention, an image processing apparatus communicating with a server on a network includes: an input unit configured to input identification information that identifies data in the server; a receiver unit configured to receive, from the server, the data identified by the identification information; a setting unit configured to set a process condition, based on attribute information of the data, to each of a plurality of processes that can be performed on the data; a selector unit configured to select a process to be performed from among the plurality of processes, to which the setting unit has set the process condition; and a control unit configured to control the executing of the process, selected by the selector unit, on the data based on the process condition set by the setting unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 11 illustrates a part of an HTML document containing a form with a POST method designated as a sending method in accordance with the first exemplary embodiment of the present invention.

FIG. 14 illustrates a dialog window shown in a step of the sequence of FIG. 13 for querying a user about how to handle undisplayable data in accordance with the first exemplary embodiment of the present invention.

DESCRIPTION OF THE EMBODIMENTS

Figure 1:
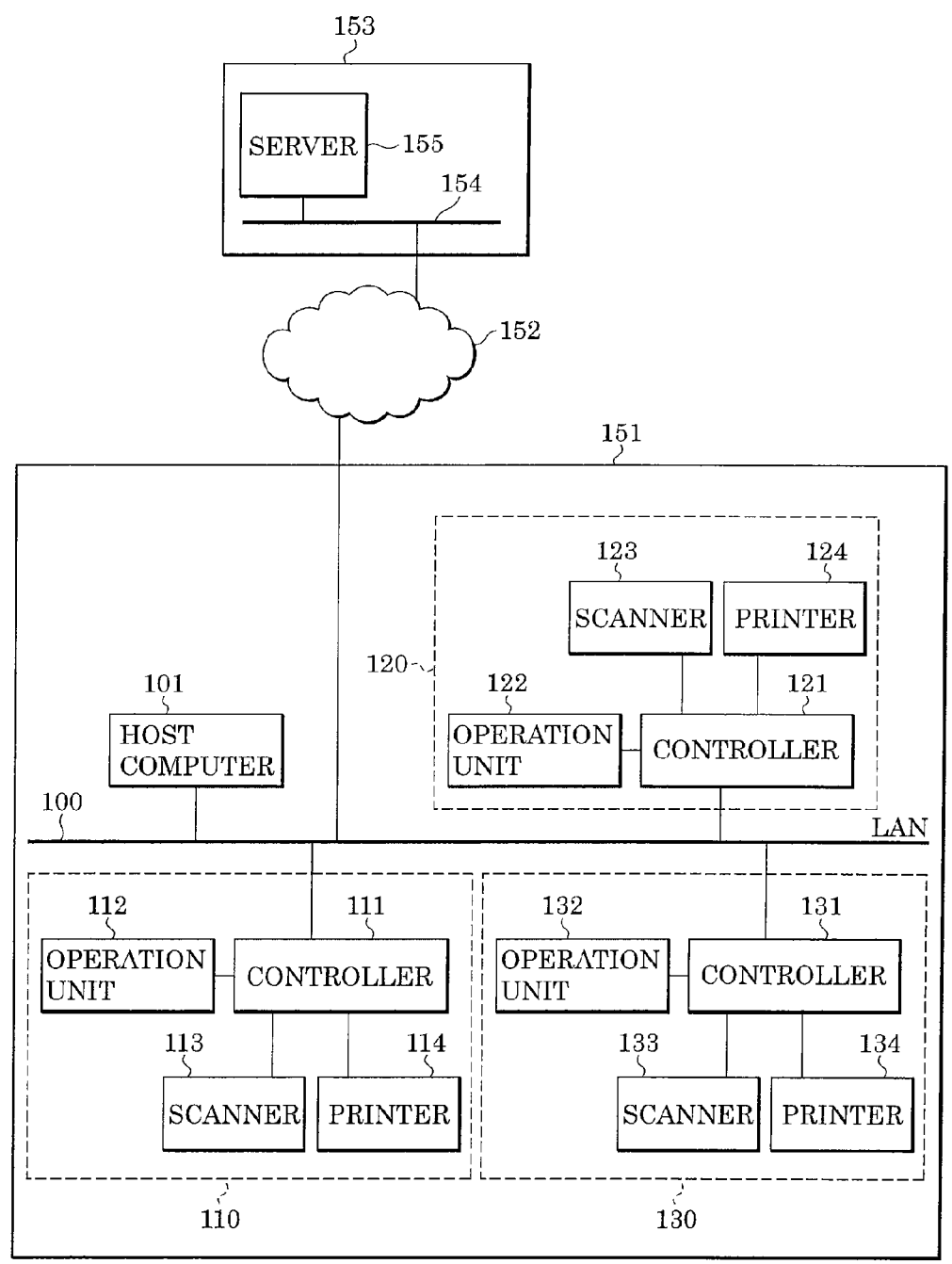
FIG. 1 is a block diagram illustrating the structure of a system including a multi-function apparatus in accordance with a first exemplary embodiment of the present invention.

The present invention will now be described in detail with reference to the drawings showing exemplary embodiments thereof. In the drawings, elements and parts which are identical throughout the views are designated by identical reference numerals, and duplicate description thereof is omitted.

First Exemplary Embodiment

FIG. 1 is a block diagram illustrating the entire structure of a system including a multi-function apparatus in accordance with a first exemplary embodiment of the present invention.

As shown in FIG. 1, the system includes an application service provider (ASP) site 153, a wide area network 152, and a user site 151. The wide area network 152 includes the Internet, for example. The wide area network 152 can be a virtual private network (VPN) on the Internet or a dedicated private network.

The ASP site 153 provides a predetermined service to the user site 151 via the wide area network 152. The service provided by the ASP site 153 includes information providing, information producing, searching, storage, authentication, distribution, publication, management, translation, agency, etc. The service also includes procedure in public offices, electronic commerce, etc. The ASP site 153 includes a local area network (LAN) 154 and a sever 155.

The LAN 154 is a network inside the ASP site 153, and network apparatuses are connected to the LAN 154. The LAN 154 is also connected to the wide area network 152 through a router.

A group of software processes is running in a server 155 to realize service provided via the wide area network 152. Software modules include an HTTP server and a group of web applications. The HTTP server transmits content, for example an HTML document, in response to a request in the HTTP protocol from a client. The web application group, installed in the form of a CGI (common gateway interface) program or Servlet, is operated by the HTTP server in response to an HTTP request, and gives an HTTP response dynamically changing in a predetermined process. Also included in the software modules are a business logic group, such as an electronic commerce program, used by the CGI program or Servlet for a predetermined process, and a database management system as a backend.

The user site 151 includes a host computer, a plurality of network apparatuses including image processing apparatuses 110, 120, and 130, and a LAN 100 connected to the network apparatus group. The LAN 100 of the user site 151 is connected to the wide area network 152 through a router. The router functions as a firewall. The router performs packet filtering to protect the user site 151 from attacks from external networks. For address management purposes, the router occasionally performs network address conversion and network port conversion. With the function of the router, communication between the user site 151 and an external network is subject to limitation. In many cases, communication in several particular protocols only is permitted. For example, an HTTP connection established from inside to outside is one example that is typically permitted. Providing application services based on widely available web technology is effective.

The image processing apparatus 110 is a multi-function peripheral (MFP) that inputs and outputs images, transmits and receives images, and performs image processing. The image processing apparatus 110 includes a scanner 113 as an image input device, a printer 114 as an image output device, a controller 111, and an operation unit 112 as a user interface. The scanner 113, the printer 114, and the operation unit 112 are each connected to the controller 111, and are controlled by a command from the controller 111. The controller 111 is connected to the LAN 100.

Similarly, the image processing unit 120 includes a scanner 123, a printer 124, and an operation unit 122. The scanner 123, the printer 124 and the operation unit 122 are connected to and controlled by a controller 121. Similarly, the image processing apparatus 130 includes a scanner 133, a printer 134, and an operation unit 132. The scanner 133, the printer 134, and the operation unit 132 are connected to and controlled by a controller 131.

The host computer 101 has a web browser, as will be discussed later, and displays statuses of the image processing units 110, 120, and 130 in response to HTML files received from the image processing units 110, 120, and 130. The host computer 101, connected to the server 155, receives service provided by the server 155 using HTTP.

Figure 2:
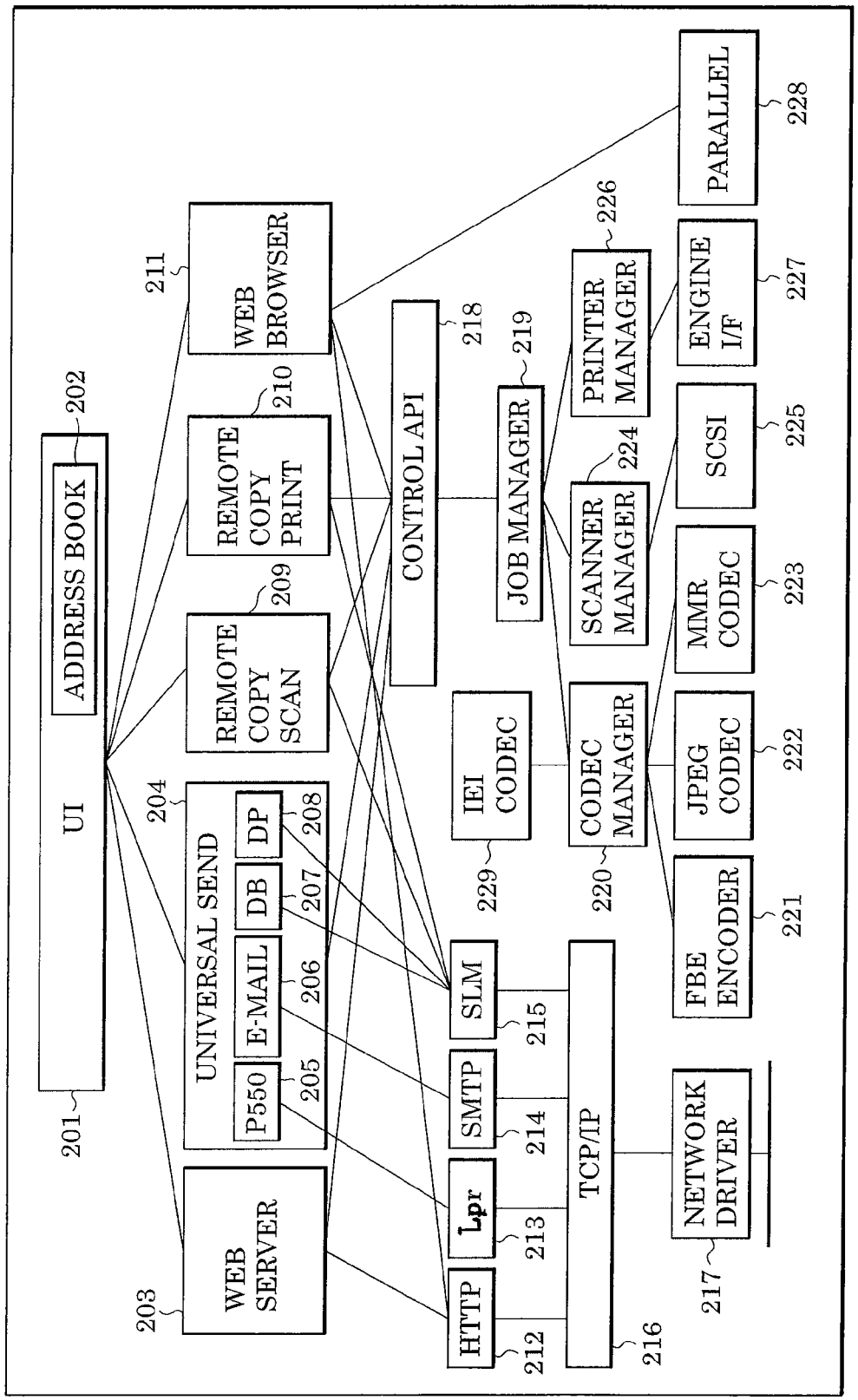
FIG. 2 is a block diagram illustrating the software structure of information processing apparatuses of FIG. 1 in accordance with the first exemplary embodiment of the present invention.

The software structure of the image processing units 110, 120, and 130 is described with reference to FIG. 2. FIG. 2 is a block diagram of the software structure of the image processing units 110, 120, and 130. Since the image processing units 110, 120, and 130 are identical to each other in software structure, only the image processing apparatus 110 is representatively described.

The image processing apparatus 110 includes a user interface (UI) module 201 as shown in FIG. 2. When an operator performs various operations and enters various settings to the image processing apparatus 110, the UI module 201 performs interfacing between the apparatus and the human operator. In response to an operation by the operator, the UI module 201 transfers input information to a variety of modules as discussed later, requests each module to process the input information, and sets data.

An address book module 202 is installed in the image processing apparatus 110. The address book module 202 is a database module for managing the destination of data and a communication destination. The user adds, deletes, or acquires data managed by the address book module 202 using the UI module 201. A user operates the address book module 202 to notify each of modules discussed later of data destination and communication destination information.

A web server module 203 is installed in the image processing apparatus 110. The web server module 203 notifies a web client (such as the host computer 101) of management information of the image processing apparatus 110 in response to a request from the web client. The management information is acquired through a universal send module 204, a remote copy scan module 209, a remote copy print module 210, and a control API (application programming interface) module 218, and then transferred to the web client through an HTTP module 212, a TCP/IP (transmission control protocol/Internet protocol) communication module 216, and a network driver 217.

Furthermore, a web browser module 211 is installed in the image processing apparatus 110. The web browser module 211 reads information from a variety of web sites (home pages) in the Internet or intranet, and displays the information. The web browser module 211 will be discussed in detail later.

The universal send module 204 controls transmission of data. The universal send module 204 sends data identified by the operator through the UI module 201 to a communication (output) destination also identified by the operator. When the operator instructs the image processing apparatus 110 to produce transmission data through the scanner function thereof, the universal send module 204 operates the control API module 218 to produce the transmission data. The universal send module 204 includes a P550 module 205 that is executed when a printer is designated as a destination, an E-mail module 206 that is executed when an E-mail address is designated as a destination, a (database) DB module 207 that is executed when a database is designated as a destination, and a DP module 208 that is executed when an information processing apparatus, identical to the image processing apparatus 110, is designated as a destination.

The remote scan module 209 reads image information using the scanner function of the image processing apparatus 110, and outputs the read image information to another information processing apparatus via a network or the like. In this way, the remote scan module 209 performs a copy function, using another information processing apparatus, although the image processing apparatus 110 can perform the copy function alone.

The remote copy print module 210 prints out image information acquired from another information processing apparatus via a network or the like using the printer function of the image processing apparatus 110. In this way, the remote copy print module 210 performs a copy function using the other information processing apparatus although the image processing apparatus 110 can perform the copy function alone.

When the image processing apparatus 110 performs HTTP communications, the HTTP module 212 is used. The HTTP module 212 provides the web server module 203 and the web browser module 211 with a communication function using the TCP/IP communication module 216. The HTTP module 212 is compatible with a variety of protocols including HTTP, and provides the communication function using a security minded protocol in particular.

An Lpr (Line printer daemon protocol) module 213 is installed in the image processing apparatus 110. The Lpr module 213 presents a communication function to the module 205 in the universal-send module 204 using the TCP/IP communication module 216. An SMTP (simple mail transfer protocol) module 214 is installed in the image processing apparatus 110. The SMTP module 214 presents a communication function to the E-mail module 206 within the universal send module 204 using the TCP/IP communication module 216.

A salutation manager (SLM) module 215 is installed in the image processing apparatus 110. Using the TCP/IP communication module 216, the SLM module 215 provides a communication function to each of the network driver 217 and the DB module 207 and the DP module 208 in the universal send module 204, the remote copy scan module 209, and the remote copy print module 210.

Using the network driver 217, the TCP/IP communication module 216 provides the above-mentioned various modules with the network communication function. The network driver 217 controls physical connection to the network.

The control API module 218 provides interfacing to an upstream module, such as the universal send module 204, and a downstream module, such as a job manager module 219 to be discussed later. In this way, the control API module 218 reduces dependency between the upstream module and the downstream module which heightens the degree of diversion of each module.

The job manager module 219 interprets a variety of processes instructed by the various modules through the control API module 218, and issues commands to each of modules 220, 224, and 226. The job manager module 219 generally manages hardware-based processes performed in the image processing apparatus 110.

The CODEC manager module 220 manages and controls compression and decompression processes from among processes in response to a command from the job manager module 219.

An FBE (Fast Boundary Encoding) encoder module 221 is installed in the image processing apparatus 110. Using an FBE format, the FBE encoder module 221 compresses data read as a result of a scan process performed by the job manager module 219 and a scan manager module 224.

A JPEG (Joint Photographic Experts Group) CODEC (compression/decompression) module 222 is installed in the image processing apparatus 110. The JPEG CODEC module 222 performs a JPEG compression process on the data and a JPEG expansion process on print data. The data to be JPEG compressed is read in a scan process performed by the job manager module 219 and the scan manager module 224, and the print data is obtained in a print process performed by a print manager module 226.

A modified modified read (MMR) compression/decompression (CODEC) module 223 is installed in the image processing apparatus 110. The MMR CODEC module 223 performs an MMR compression process on data and an MMR decompression process on print data. The data to be MMR compressed is read in the scan process performed by the job manager module 219 and the scan manager module 224, and the print data is obtained in the print process performed by the print manager module 226.

An information embedded image (IEI) CODEC module 229 is installed in the image processing apparatus 110. The IEI CODEC module 229 decodes information embedded in image data and embeds information into print image data. The data having the information embedded therein is read in the scan process performed by the job manager module 219 and the scan manager module 224, and the print image data is obtained in the print process performed by a print-manager module 226. The information embedding into the image data is performed using coding techniques, such as bar code and digital watermark. The IEI CODEC module 229 supports, as one type of decoding technique, character recognition for recognizing characters in an image of the image data using image segmentation technique and optical character reading (OCR) technique and converting the recognized characters into text data. The IEI CODEC module 229 supports, as one type of encoding technique (information embedding technique), data conversion from text data to image data through a raster image processor, and overlaying of the converted image data and original image data.

The image processing apparatus 110 also includes a scan manager module 224 that manages and controls a scan process in response to a command from the job manager module 219. Communications are made between the scan manager module 224 and the scanner 113 in the image processing apparatus 110 through a SCSI (small computer system interface) driver 225.

The print manager module 226 manages and controls a print process in response to a command from the job manager module 219. An engine interface (I/F) module 227 provides interfacing between the print manager module 226 and the printer 114.

A parallel port driver 228 provides interfacing to the web browser module 211 when the web browser module 211 outputs data to an output device (not shown) through a parallel port.

Figure 3:
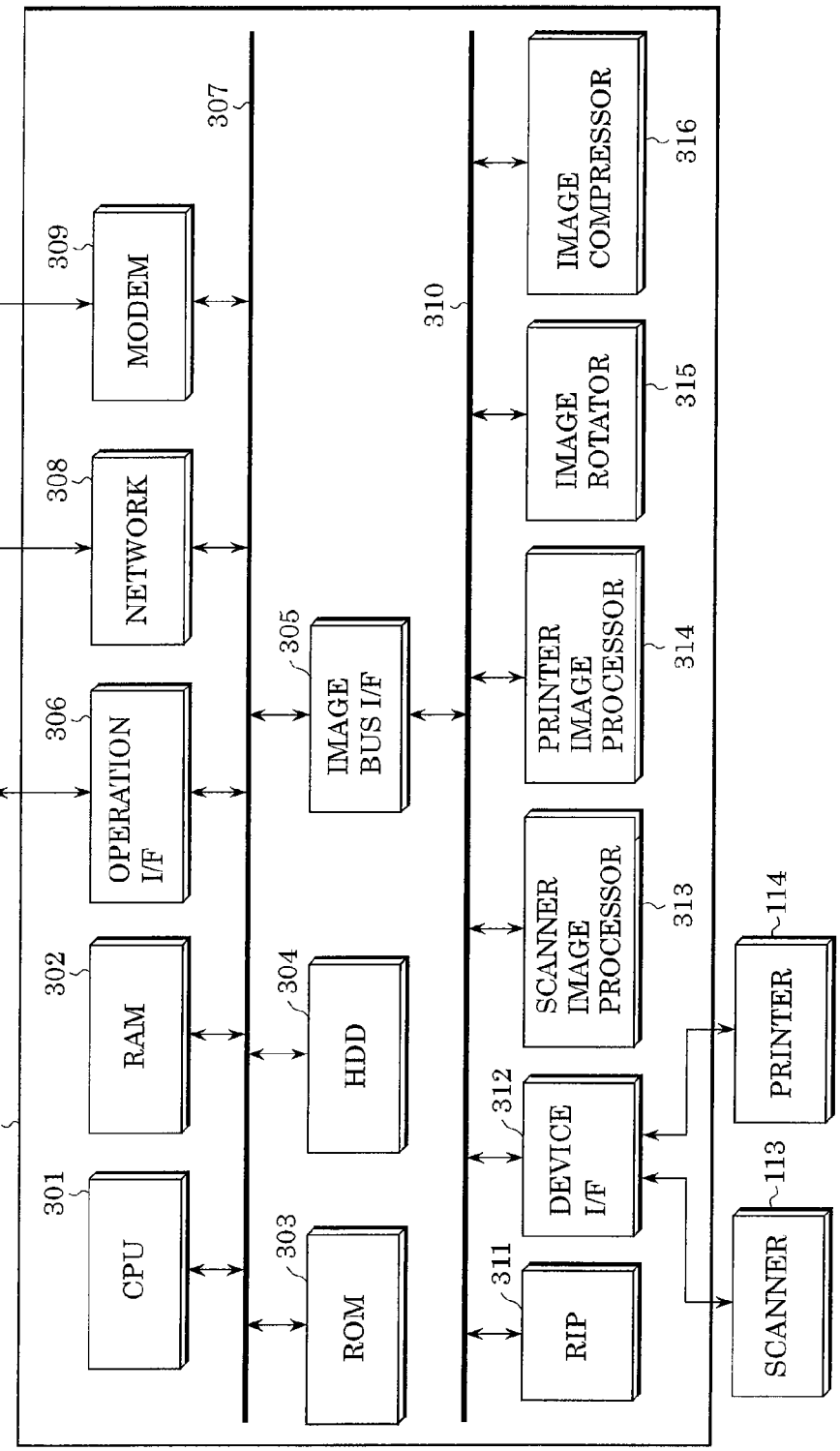
FIG. 3 is a detailed block diagram of the information processing apparatus of FIG. 1 in accordance with the first exemplary embodiment of the present invention.

The structure of the image processing apparatus 110 is described below with reference to FIG. 3. FIG. 3 is a block diagram illustrating in detail the image processing apparatus 110 of FIG. 1. Since the image processing apparatuses 110, 120, and 130 are identical to each other in structure, the only image processing apparatus 110 is described.

As shown in FIG. 3, the image processing apparatus 110 includes the controller 111. The controller 111 is connected to the scanner 113 as an image input device, and the printer 114 as an image output device to control these units. The controller 111 is also connected to a LAN and/or a public telephone line. Through the LAN and/or the public telephone line, the controller 111 inputs and outputs image information and device information.

The controller 111 includes a central processing unit (CPU) 301. The CPU 301 is connected, through a system bus 307, to a random-access memory (RAM) 302, a read-only memory (ROM) 303, a hard disk drive (HDD) 304, an image bus interface (I/F) 305, an operation I/F 306, a network I/F 380, and a modem 309.

The RAM 302 provides a work area for the CPU 301, and also serves as an image memory for temporarily storing image data. The ROM 303, functioning as a boot ROM, stores a boot program of the system. The HDD 304 stores system software and image data.

The operation I/F 306 serves as an input and output interface for the operation unit 112. The operation I/F 306 outputs image data to the operation unit 112 for displaying, and transfers information input through the operation unit 112 by a user to the CPU 301.

The network I/F 308 is connected to the LAN and inputs information from and outputs information to the LAN. The modem 309 is connected to the public telephone line, and inputs information from and outputs information to the public telephone line.

An image bus I/F 305 connects the system bus 307 to an image bus 310 that transfers the image data at a high speed, and converts data structures.

Connected to the image bus 310 are a raster image processor (RIP) 311, a device I/F 312, a scanner image processor 313, a printer image processor 314, an image rotator 315, and an image compressor 316.

The RIP 311 expands PDL code received from the LAN into a bitmap image. The device I/F 312, connecting the scanner 113 and the printer 114 to the controller 111, performs synchronous/asynchronous conversion on image data. The scanner image processor 313 corrects, reconstructs, and edits input image data. The printer image processor 314 performs printer correction and resolution conversion on input and output image data. The image rotator 315 rotates the image data. The image compressor 316 performs JPEG compression/decompression processing on multi-valued image data, or performs JBIG (Joint Bi-Level Image Experts Group), MMR, or MH (Modified Huffman) based compression/decompression processing on binary image data.

Figure 4:
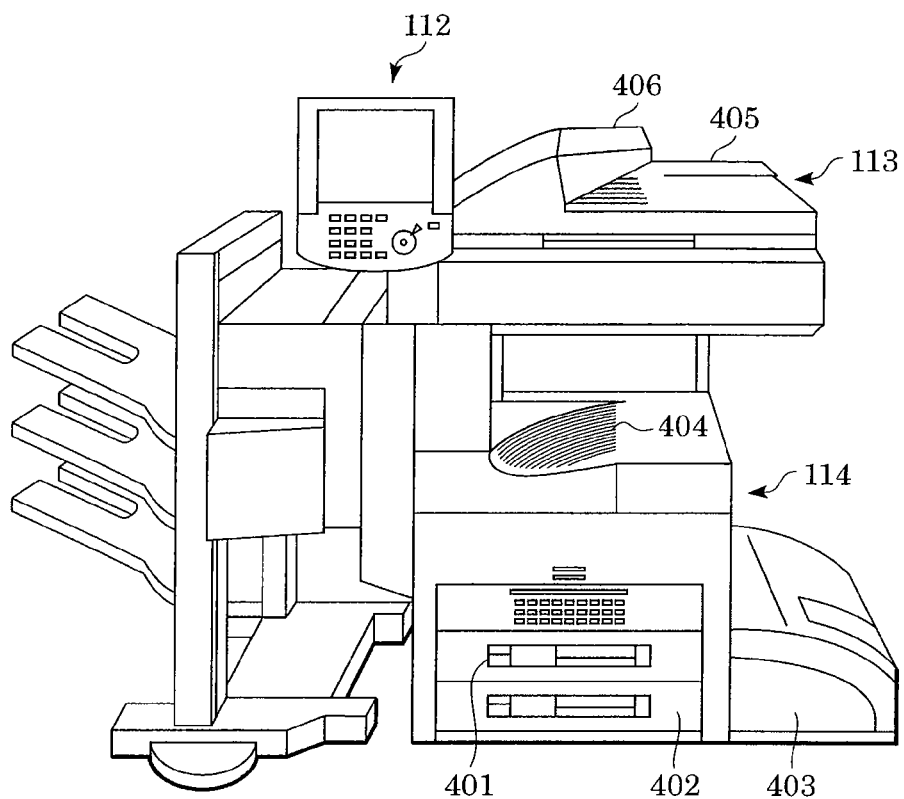
FIG. 4 is an external view of the information processing apparatus of FIG. 1 in accordance with the first exemplary embodiment of the present invention.

The image processing apparatus 110 thus constructed is described with reference to an external view thereof shown in FIG. 4. Since the image processing apparatuses 110, 120, and 130 have the same external appearance, only the image processing apparatus 110 is described.

In the image processing apparatus 110, the scanner 113 illuminates an image on a sheet of paper as an original document. With a charge-coupled device (CCD) scanning the image, a raster image is generated. A user sets the original document in a tray 406 of a document feeder 405 and inputs a scan start command in the operation unit 112. The CPU 301 in the controller 111 issues a start command to the scanner 113. The document feeder 405 feeds the original document page by page, and the scanner 113 start reading the original document fed by the document feeder 405.

The printer 114, for printing raster image data on the sheet of paper, performs an electrophotographic operation using a photoconductive drum or a photoconductive belt. Other printing methods may be employed. For example, an ink-jet printing method for directly printing the image on a sheet of paper by ejecting ink from an array of tiny nozzles may be used. The print operation of the printer 114 is initiated in response to a command from the CPU 301. The printer 114 includes a plurality of paper feed trays so that a different sheet size and a different sheet alignment may be selected. Namely, paper cassettes 401, 402, and 403 are mounted. A discharge tray 404 is mounted to receive printed sheets.

Figure 5:
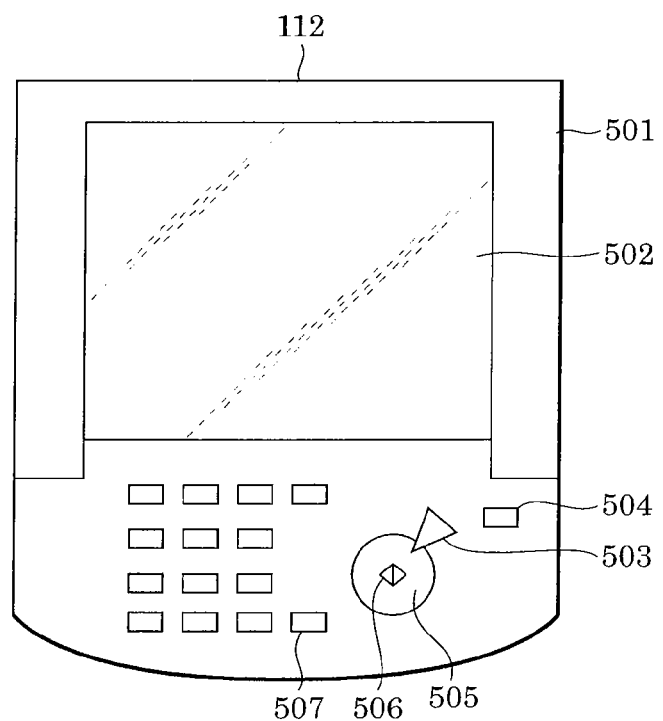
FIG. 5 is a front view of an operation unit of FIG. 1 in accordance with the first exemplary embodiment of the present invention.

The structure of the operation unit 112 is described with reference to FIG. 5. FIG. 5 shows an external appearance of the operation unit 112 of FIG. 1.

As shown in FIG. 5, the operation unit 112 includes an LCD (liquid crystal display) 501 having a touch-panel sheet 502 bonded thereon. The LCD 501 displays an operation screen of the system and software keys. If any displayed key is selected, position information of the selected key is transferred to the CPU 301.

The operation unit 112 includes a variety of hardware keys including a start key 505, a stop key 503, an identification (ID) key 507, and a reset key 504. The start key 505 is used to initiate the operation of reading the image on the original document. A red and green bicolor LED display 506 is provided at the center of the start key 505. The bicolor LED display 506 indicates whether or not the start key 505 is ready for use. The stop key 503 is used to stop the operation in the middle thereof. The ID key 507 is used to input the ID of a user. The reset key 504 is used to initialize settings input from the operation unit 112.

Figure 6:
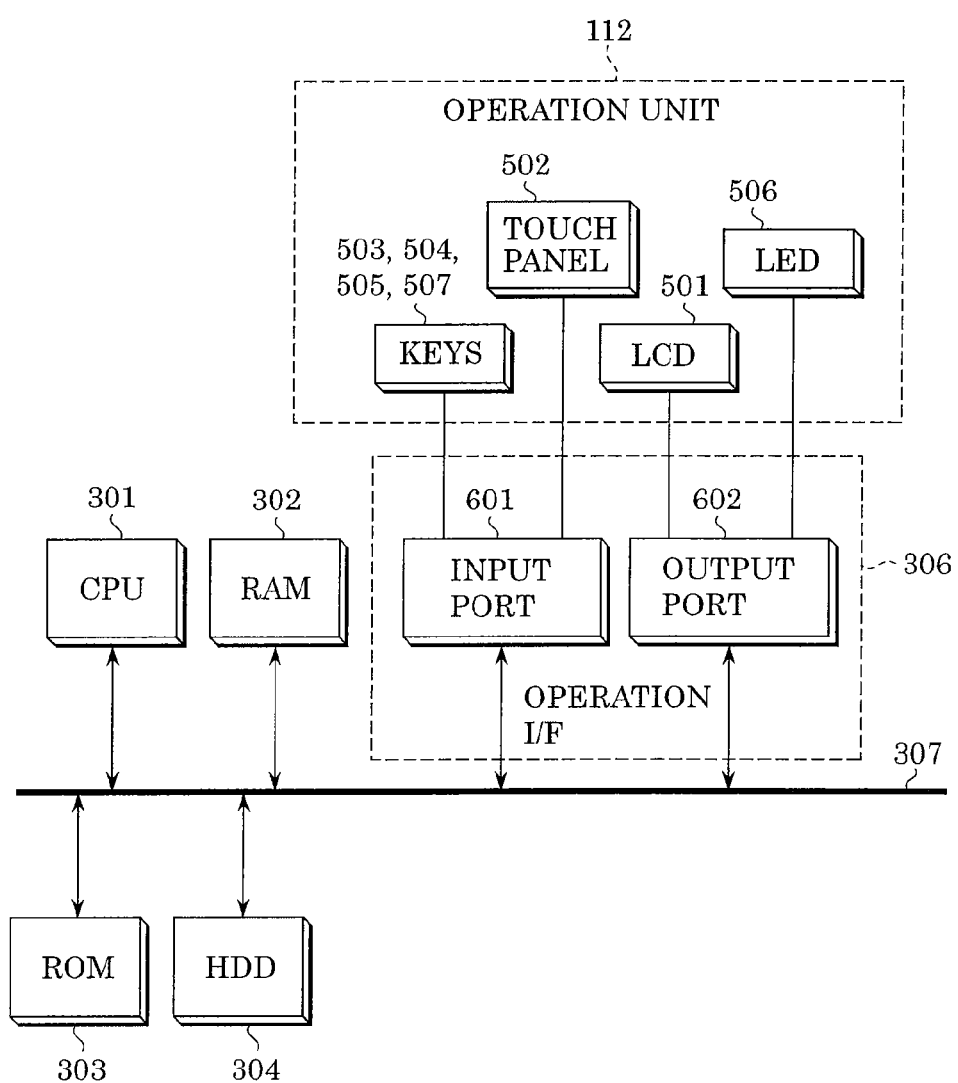
FIG. 6 is a block diagram illustrating in detail the operation unit of FIG. 1 in accordance with the first exemplary embodiment of the present invention.

The structure of the operation unit 112 is described now with reference to FIG. 6. FIG. 6 is a block diagram illustrating in detail the structure of the operation unit 112.

As shown in FIG. 6, the operation unit 112 is connected to the system bus 307 through the operation I/F 306. As previously discussed, the CPU 301, the RAM 302, the ROM 303, the HDD 304, etc. are connected to the system bus 307.

The operation I/F 306 includes an input port 601 for controlling inputs from the user, and an output port 602 for controlling the display screen output devices. The input port 601 transfers, to the CPU 301, user inputs from a group of keys including the touch-panel sheet 502, and hardware keys 503, 504, 505, and 507. The CPU 301 generates display screen data in response to the contents of the user input and a control program, and outputs the display screen output data to the LCD display 501 through the output port 602. The CPU 301 controls the bicolor LED display 506 through the output port 602 as necessary.

Figure 7:
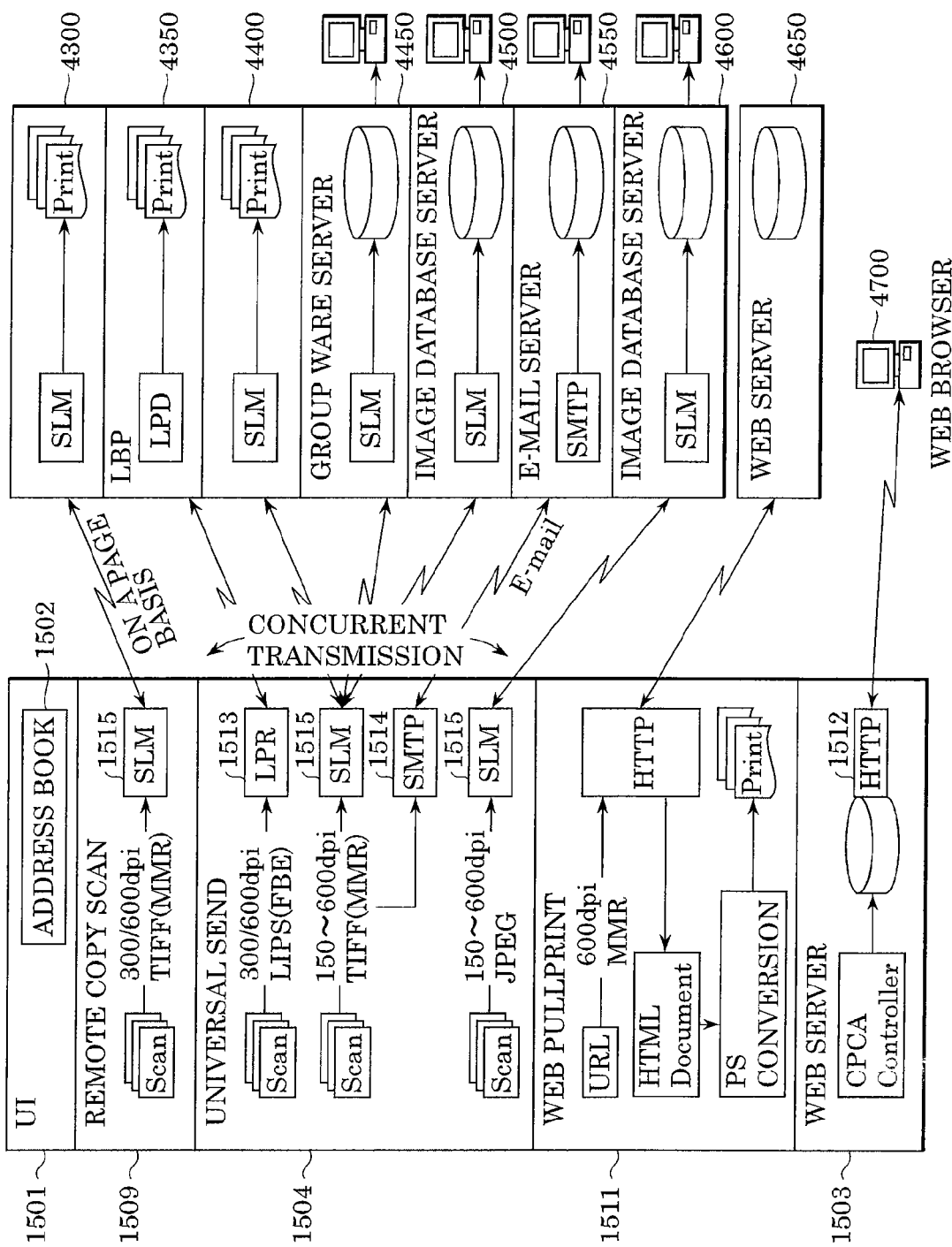
FIG. 7 is a block diagram of a network illustrating the operation of applications installed in the information processing apparatuses of FIG. 1 in accordance with the first exemplary embodiment of the present invention.

The operation of the application program installed in the image processing apparatuses 110, 120, and 130 is described now with reference to FIG. 7. FIG. 7 is a block diagram illustrating the structure of the network of the system.

As shown in FIG. 7, each of the image processing apparatuses 110, 120, and 130 gains access to each of a multifunction apparatus 4300 on a receiver (printer) side in remote copying, a printer device 4350, such as a laser beam printer (LBP) for printing a received image universally sent from a universal send module 1504, a device 4400 on the receive (printer) side, a groupware server 4450 for receiving and storing a universally sent images, image database servers 4500 and 4600 for receiving and storing universally sent binary images, a mail server 4550 for receiving and storing universally sent image, a web server 4650 holding information content, and a web browser 4700 for accessing a web server.

The applications installed in the image processing apparatuses 110, 120, and 130 includes a UI application program 1501, a remote copy application program, a universal transmission application program, a web pullprint application program, and a web server application program.

The UI application program 1501 includes a UI module 201 as previously discussed. An address book 1502 (corresponding to the address book module 202 of FIG. 2) contained in the UI application program 1501 is stored in a non-volatile memory (such as the HDD 304) of each of the image processing apparatuses 110, 120, and 130. Features of each apparatus connected to the network are stored in the address book 1502. More specifically, the address book 1502 stores information listed as follows:

alias name or formal name of device,
network address of the device,
network protocol processable by the device,
document format processable by the device,
compression type processable by the device,
image resolution processable by the device,
sheet size and information about paper feed tray in the case of a printer device, and
folder name storing document in the case of a server.

Each of the remote copy application program, the universal transmission application program, the web pullprint application program, and the web server application program determines the feature of a transmission destination based on the information held in the address book 1502. The address book 1502 is editable. The address book 1502, stored in a server in the network, is downloaded for use, or directly referenced.

The remote copy application program includes a remote copy scan module 1509 (corresponding to the remote-copy-scan module 209 of FIG. 2). In accordance with resolution information processable by a device that is designated as a recognizable destination by the address book 1502, the remote copy application program MMR compression processes a binary image read by the scanner, organizes the compressed image into a tagged image file format (TIFF), and then sends the TIFF data to the multi-function apparatus 4300 on the network through an SLM module 1515 (corresponding to the SLM module 215 of FIG. 2).

The universal transmission application program includes a universal-send module 1504 (corresponding to the universal-send module 204 of FIG. 2). Unlike the remote copy application program, an image can be sent to a plurality of destinations at a single image scan. The image can be directly sent to destinations including but not limited to a printer device and a server. Each of the destinations is described below.

If the network printer protocol of a destination device is a line printer daemon (LPD) and if it is determined from the address book 1502 that the destination device can process known printer description language (PDL), an image is read at the image resolution of the destination device recognized by the address book 1502. The image is compressed by an FBE encoder module (corresponding to the FBE-encoder module 221 of FIG. 2), and is then converted to PDL. An LPR module 1513 (corresponding to the Lpr module 213 of FIG. 2) transmits the PDL data to a printer device 4350 as a destination.

If the destination device is a server and communicable using the SLM thereof, the server address and a folder designation of the server are recognized from the address book 1502. As the remote copy application program, the universal transmission application program MMR compression processes a binary image read by the scanner, organizes the compressed image into TIFF, and then sends the TIFF data to a particular folder in servers 4550 and 4500 on the network through an SLM module 1515 (corresponding to the SLM module 215 of FIG. 2). If the destination server is determined as being capable of processing JPEG compressed multi-value images, the image read by the scanner is JPEG compressed, organized in JPEG file interchange format (JFIF), and stored in a particular folder in a server 4600 on the network through the SLM 1515.

If the destination device is an E-mail server, a mail address written in the address book 1502 is recognized. A binary image read by the scanner is MMR compressed, TIFF formatted, and then transmitted to an E-mail server 4550 through an SMTP module 1514 (corresponding to the SMTP module 214 of FIG. 2). Subsequent transmission is performed by the E-mail server 4550.

The web pullprint application program includes a web pullprint module 1511 (corresponding to the web browser module 211 of FIG. 2). The web pullprint application program prints information at a web site, such as the web server 4650.

The web server application, including a web server module 1503 (corresponding to the web-server module 203 of FIG. 2), provides information written in HTML to a web browser 4700 through an HTTP module 1512 (corresponding to the HTTP module 212). The web server application program not only supplies the web browser 4700 with static HTML document, but also dynamically produces a document accounting for the management information of the apparatus and sends the document to the web browser 4700.

The management information of the image processing apparatus 110 is acquired through the universal send module 204, the remote copy scan module 209, the remote copy print module 210, and the control API module 218, and then notifies a web client through the HTTP module 212, the TCP/IP communication module 216, and the network driver 217. The web-server module 203 provides the web client with a reference print function. In the reference print function, the web client sends, to the web server module 203, URL information as the content of a POST request in an HTTP form (or URL information embedded in a GET request path). Upon receiving the URL information, the web server module 203 acquires data from the location of the URL in the HTTP protocol, and performs a print operation by directly transferring the acquired data to the control API module 218. If printable data, such as PDL data, is located at a position from where HTTP can acquire data, the client can perform a printing operation by simply notifying the web browser 4700 of the URL (by simply sending "reference" without transmitting the body of the data). The printer is provided with a direct print function that directly prints PDF data, and application data in addition to the PDL data. Thus, a variety of data scattered on the web servers on the network is efficiently printed.

Figure 8:
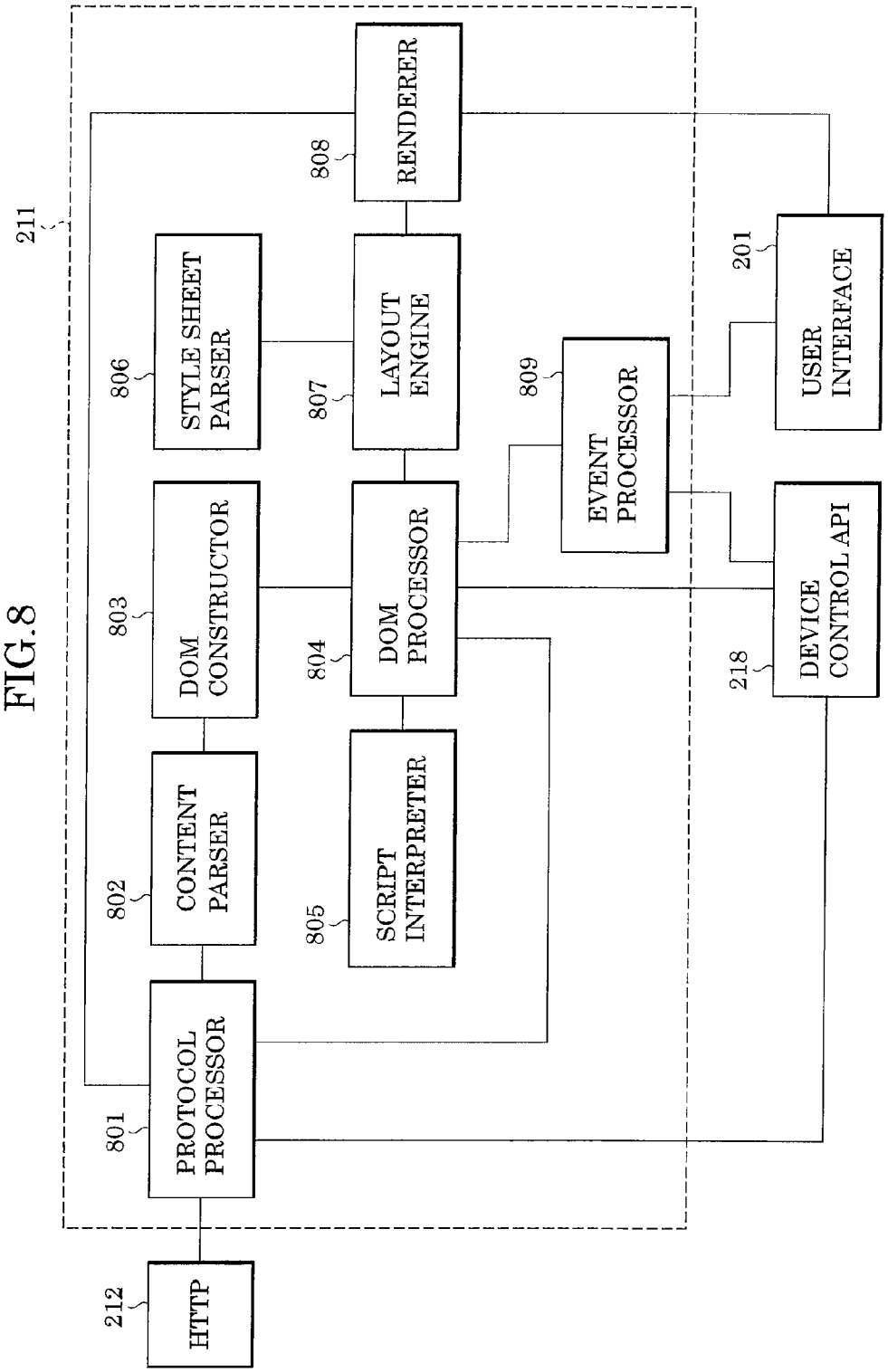
FIG. 8 is a block diagram illustrating the software structure of a web browser module of FIG. 2 in accordance with the first exemplary embodiment of the present invention.

The software structure of the web browser module 211 is described now with reference to FIG. 8. FIG. 8 is a block diagram illustrating the software structure of the web browser module 211 of FIG. 2.

As shown in FIG. 8, the web browser module 211 includes a protocol processor 801, a content parser 802, a DOM (document object model) constructor 803, a DOM processor 804, a layout engine 807, a style sheet parser 806, a renderer 808, a script interpreter 805, and an event processor 809.

The protocol processor 801 establishes connection with and communicates with another network through the web HTTP module 212. In this communication, an HTTP request is issued to a source described in a URL, and a response is obtained. In this process, communication data is coded and encoded in accordance with any of a variety of code forms.

The content parser 802 receives, from the protocol processor 801, content data in an HTML form, an XML (eXtensible Markup Language), or an XHTML (eXtensible HyperText Markup Language) form, and performs a lexical analysis and parsing, thereby producing a parse tree.

Upon receiving the parse tree from the content parser 802, the DOM constructor 803 constructs a document object model (DOM) in response to the structure of the content data. Known HTML permits a variety of grammatical omissions, and has a wide range of variations. Content used in practice is frequently neither well-formed nor valid. As other typical web browsers, the DOM constructor 803 infers a correct logical structure from grammatically invalid content data, thereby constructing a valid DOM.

The DOM processor 804 holds and manages in a memory, a tree structure, expressing a nested relation of a group of objects, as the DOM constructed by the DOM constructor 803. A variety of processes of web browser are carried out with respect to the DOM.

The layout engine 807 determines recursively the presentation of each object on the display in accordance with the tree structure of the object group held in the DOM processor 804, and results in the layout of the entire document. The presentation of the object on the display is explicitly designated in a style sheet format, such as cascading style sheet (CSS) using a description embedded in a document or a description in another file linked to the document. The layout engine 807 determines the layout of a document accounting for the results of an analysis of the style sheet provided by the style sheet parser 806.

The style sheet parser 806 analyzes the style sheet associated with the document of content.

The renderer 808 generates graphical user interface (GUI) data to be displayed on the LCD 501 in accordance with the layout of the document determined by the layout engine 807. The generated GUI data is displayed on the LCD 501 through the UI module 201.

The event processor 809 receives, as an event, an operational input which the user enters using the touch-panel sheet 502 and keys on the operation unit 112, and performs a process in response to the event. The event processor 809 receives a state transition event in devices and jobs from the control API module 218, and performs a process in response to the event. An event handler corresponding to each event is registered on a per object class basis or on a per object instance basis in the tree structure of the DOM managed by the DOM processor 804. In response to the generated event, the event processor 809 determines an object for processing that event, from among an object group managed by the DOM processor 804, and sends that event. The object receiving the event executes a variety of processes in accordance with the algorithm of an event handler corresponding to the event. The processes of the event handler include the updating of the DOM held by the DOM processor 804, the issuing of a re-rendering command to the layout engine 807, the issuing of a command to issue an HTTP request to the protocol processor 801, the controlling of the function of the image processing apparatus 110 by calling the control API module 218.

The script interpreter 805 interprets and executes a script, such as a Java® script (European Computer Manufacturers' Association (ECMA) script). To perform a process on the DOM, the script is embedded in a document or described in another file linked to the document. A provider of content can program the dynamic behavior of the document provided.

Figure 9:
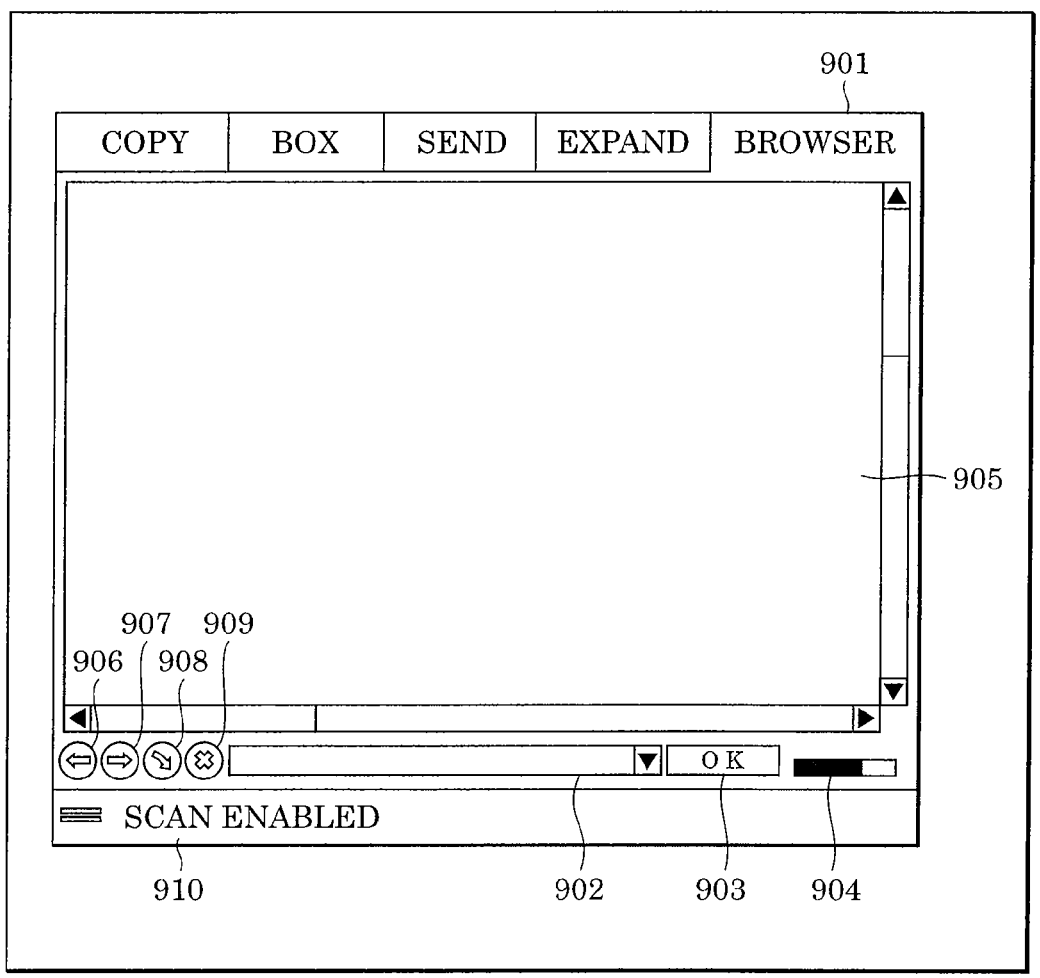
FIG. 9 illustrates the screen of the web browser on a liquid crystal display presented by a user interface in accordance with the first exemplary embodiment of the present invention.

The structure of the screen of a web browser displayed on the LCD 501 by the UI module 201 is described with reference to FIG. 9. FIG. 9 illustrates the screen of the web browser displayed on the LCD 501 by the UI module 201.

Displayed on the screen of the web browser presented on the display 501 by the UI module 201 as shown in FIG. 9 are a tab 901, a URL input field 902, an OK button 903, a progress bar 904, a content display area 905, a return button 906, an advance button 907, a re-load button 908, a stop button 909, and a status area 910.

The tab 901 switches the screen between a web browser function and other functions (including copy, box, send, and expand). The URL input field 902 is used to input a URL of a resource desired by the user. If the field is selected by the user, a virtual full keyboard (not shown) is displayed to accept character inputs. The user inputs a desired character string using software keys simulating a keytop of the virtual full keyboard.

The OK button 903 is a software key to validate the entered URL character string. If the URL is validated, the web browser module 211 issues an HTTP request to acquire the resource. The progress bar 904 indicates the progress of a content acquisition process in accordance with the HTTP reply in response to the HTTP request. The content display area 905 serves as a display area where the acquired resource is displayed. The return button 906 is used to return to previous content displays so that the content displayed prior to the content currently being displayed is displayed again. The advance button 907 is used to advance to the content subsequent to the currently displayed content when the content displaying is performed in retrospect. The re-load button 908 is used to re-acquire and re-display the currently displayed content. The stop button 909 is used to stop the content acquisition process currently in progress.

The status area 910 serves as a display area where a message from a variety of functions of the image processing apparatus 110 is displayed. The status area 910 displays a message to draw attention of the user from other functions, such as a scanner or a printer, even while the web browser screen is presented. Likewise, a message from the web browser function can be displayed in the tab status area 910. With the web browser function, the URL character string of the link destination, a title character string of the content, a message requested by the script can be displayed on the status area 910.

Figure 10:
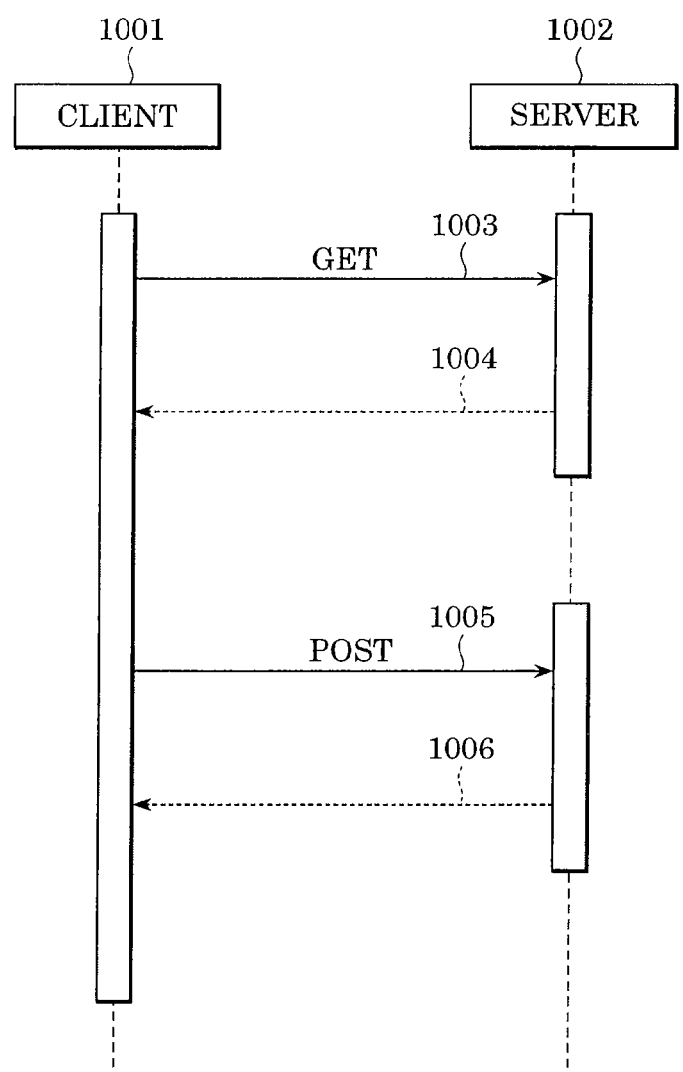
FIG. 10 illustrates the sequence of request and replay process of an HTTP protocol in accordance with the first exemplary embodiment of the present invention.

The operation of the first exemplary embodiment of the present invention is described now with reference to FIG. 10. FIG. 10 illustrates the sequence of the request and replay in the HTTP protocol in accordance with the first exemplary embodiment.

As shown in FIG. 10, a client 1001 is a software program for transmitting an HTTP request and receiving an HTTP reply. The client 1001 corresponds to the web browser in each of the image processing apparatuses 110, 120, and 130, an ordinary web browser running in a PC, a personal digital assistance (PDA), or a cellular phone, or a variety of software programs that access a web server in the same manner as the web browser to use or relay service. A server 1002 is a software program for performing a process in response to a received HTTP request, and returns an HTTP reply. The server 1002 corresponds to an HTTP server containing a software program running in the server 155 of the first exemplary embodiment.

The client 1001 can transmit the HTTP request in one of a GET method and a POST method. When the client 1001 transmits an HTTP request 1003 intended for a desired resource to the server 1002 in the GET method, the resource is typically designated by the uniform resource identifier (URI: Universal Resource Identifier), such as the URL (Universal Resource Locator). The server 1002 acquires or generates data corresponding to the resource designated by the HTTP request 1003, and returns the data in an HTTP reply 1004. If the designated resource is a static file, the server 1002 acquires the data by reading the corresponding file from a file system of the server 155. If the designated resource is a process of a CGI program or Servlet, the server 1002 performs the corresponding process. In the process, the reply to the request is generated. The process is also associated with secondary processes, such as the execution of business logics and the accessing to a backend database management system (DBMS) to provide the predetermined service. The data generated as a result of the process is then replied. For example, when a resource for displaying a catalog of expendable items for use in the image processing apparatus 110 is designated, a software program for electronic commerce is executed. The software program references records, such as latest prices and inventory of sheets of paper, toner, parts, etc. in a database, and constructs these pieces of information in an HTML form or an XML form, in order to produce catalog document data.

If the client 1001 can display the data obtained from the HTTP reply 1004, the client 1001 displays the content. If the received data is an HTML document, new resources are successively acquired and displayed by simply selecting link information embedded in the document displayed on the browser as a hypertext.

The transmission of the HTTP request in the POST method is described below. If a form is contained in the HTML document, and the POST method is designated as the sending method (see the HTML document of FIG. 11), the web browser of the client 1001 codes information input by the user in the displayed form. The coded information, namely, the input content of the form is attached to an HTTP request 1005 and transmitted to the server 1002. In the server 1002, the designated resource receives and processes the data transmitted from the client 1001, generating an HTTP reply 1006. The HTTP reply 1006 is then transmitted back to the client 1001.

The data returned from the server 1002 to the client 1001 as the HTTP reply 1006 is described in accordance with a content-type attribute of a protocol header. For example, if the returned HTTP reply 1006 is an HTML document, the description is content-type: text/html; charset=Shift_JIS. If the returned HTTP reply 1006 is a PDF document, the description is content-type:application/pdf.

Figure 12:
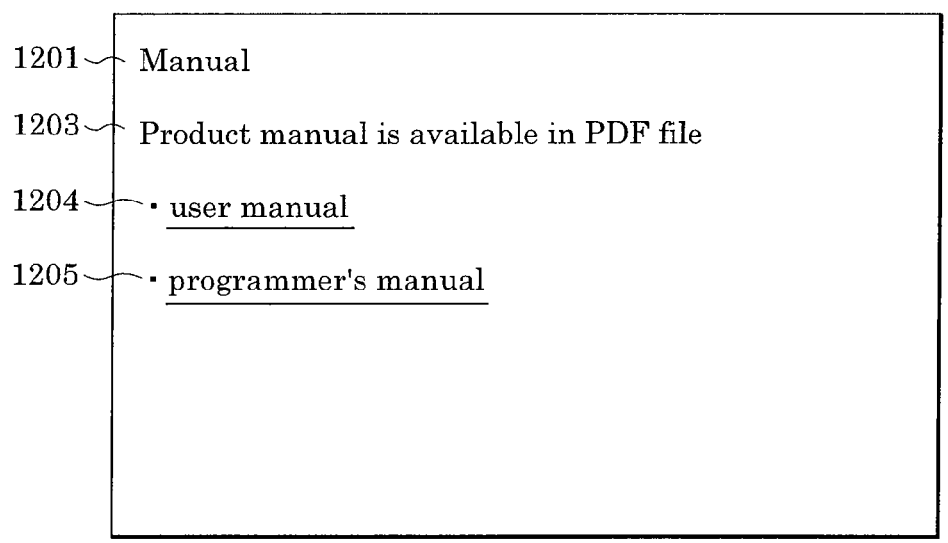
FIG. 12 illustrates the screen presented on a content display area of the web browser in response to the HTML document of FIG. 11 in accordance with the first exemplary embodiment of the present invention.

The structure of the HTML document containing the form with the POST method designated as the sending method and the screen displayed based on the HTML document are now described with reference to FIGS. 11 and 12. FIG. 11 shows one example of HTML document containing the form with the POST method designated as the sending method. FIG. 12 illustrates the screen displayed on the content display area 905 of the web browser based on the HTML document of FIG. 11.

Row numbers are attached for convenience only, and are not contained in the actual HTML document. A first row represents the start of an HTML element. A second row represents a head element and a title element contained therewithin. A third row represents the start of a body. A fourth row represents an H1 element. A fifth row represents the start of a P element. A sixth row represents the P element. A seventh row represents the end of the P element. An eighth row represents a UL element. Ninth and tenth rows represent LI elements, respectively. Each LI element contains an A element. The A element states a link to a resource at a location which the HREF attribute thereof references. An eleventh row represents the end of the UL element. A twelfth row represents the end of the body element. A thirteenth row represents the end of the HTML element.

The user acquires the HTML document of FIG. 11 from the web server via the Internet or intranet as a result of browsing of the apparatus' built-in browser. The screen corresponding to the document is displayed in the content display area 905 (see FIG. 9) of the web browser. For example, as shown in FIG. 12, the screen corresponding to the HTML document of FIG. 11 includes a line 1201 corresponding to the H1 element at the fourth row of FIG. 11, a line 1202 corresponding to the P element at the fifth to seventh rows of FIG. 11, a line 1203 corresponding to the LI element at the ninth row of FIG. 11, and a line 1204 corresponding to the LI element at the tenth row of FIG. 11. The lines 1203 and 1204 are underlined to show that these character strings are a content of the A attribute, and a link to the resource. The expression of the link can be modified depending on the setting of the environment of the browser or the style sheet embedded in the document.

Figure 13:
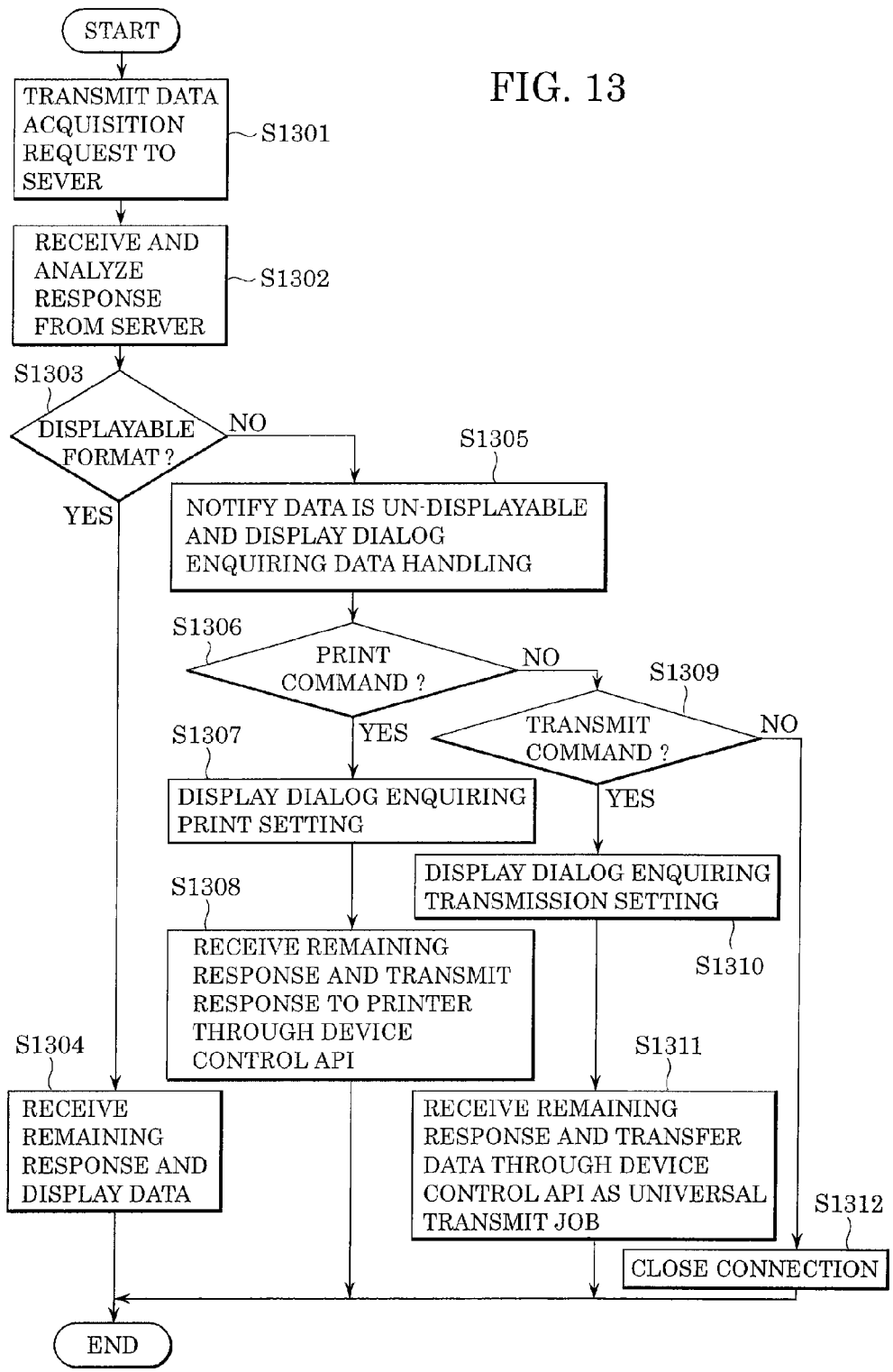
FIG. 13 is a flowchart illustrating the sequence of the web browser in the information processing apparatus of FIG. 1 for acquiring data from a server in response to an HTTP request in accordance with the first exemplary embodiment of the present invention.

The procedure of the browser in each of the image processing apparatuses 110, 120, and 130 for acquiring data from the server 155 in response to the HTTP request is described below. FIG. 13 is a flowchart of the data acquisition process in which the web browser of each of the image processing apparatuses 110, 120, and 130 of FIG. 1 acquires the data from the server 155 in response to the HTTP request.

As shown in FIG. 13, the web browser in each of the image processing apparatuses 110, 120, and 130 sends a data acquisition request using HTTP to the server 155 (step S1301). For example, if the user selects the line 1203 of FIG. 12, the A element at the ninth row of FIG. 11 is selected. The web browser reconstructs an absolute URL from a relative URL which the HREF attribute of the A element references. More specifically, the web browser interprets the value of the HREF attribute as a relative path from the absolute URL of the HTML document of FIG. 11. For example, if the HTML document of FIG. 11 is http://canon.jp/support/document/index.html, the HTML document is interpreted as http://canon.jp/support/document/user-manual.pdf.

To acquire the reconstructed URL, the web browser is connected to a port of the server described in the absolute URL (a default value of 80 for TCP in the case of the HTTP protocol) using a protocol (HTTP in this case, from among HTTP, HTTPS, FTP, etc.) described in the URL, and requests the server to acquire the resource.

The web browser receives a byte stream sent from the server 155 in response to the data acquisition request in HTTP and analyzes the HTTP header (step S1302). An HTTP response header is embedded in the front of the byte stream. Based on the value of the contents-type in the response header, the web browser can determine the form of the data that is going be received as the subsequent byte stream.

The web browser determines whether or not the received data is displayable (step S1303). If it is determined that the received data is displayable, the web browser receives the remaining response byte stream, and displays the received data in the content display area 905 (step S1304). The web browser ends processing.

If it is determined in step S1303 that the received data is undisplayable, the web browser displays a dialog window in a popup fashion to query the user about how to handle the undisplayable data (step S1305). This dialog presents candidates of alternative processes to the user for selection. The print function can process several predetermined forms of data, including PDL, such as PostScript, application data, such as PDF, image data, such as JPEG image data. The universal send function can process several predetermined forms of data, such as JPEG image, MMR compressed TIFF image, etc. In the first exemplary embodiment, the print function as an alternative optional process is selected only when the received data is printable, and the send function is selected only when the received data is transmittable. As another option, a "store" function may be presented to acquire the data first and then to store the data in the HDD 304 or the like for later processing. If no alternative processes are possible, or if the user does not want to select an alternative process, a "cancel" function is selected.

The web browser determines in step S1306 whether or not a reply from the user is a print command. If it is determined that the user reply is a print command, a dialog window querying the user about print setting is popped up in step S1307. The web browser receives the remaining reply byte stream, and inputs, to the image processing apparatus through the control API module 218, the received data as a print job that accounts for the print setting designated by the user (step S1308). The web browser ends processing.

If it is determined in step 1306 that the user reply is not a print command, the web browser determines in step S1309 whether or not the user reply is a send command. If it is determined that the user reply is a send command, the web browser displays a dialog window in a popup fashion querying the user about send setting (step S1310). The web browser receives the remaining byte stream, and inputs, to the image processing apparatus through the control API module 218, the received data as a universal send job that accounts for the print setting designated by the user (step S1311). The web browser ends processing.

If it is determined in step S1309 that the user reply is not a send command, the remaining alternative process is a "cancel" operation. The web browser opens the HTTP connection in response to a cancel command from the user, and stops data reception (step S1312). The web browser ends processing.

If the received data cannot be displayed, the preceding content may remain displayed on the content display area 905. If the acquired data is undisplayable, a message to that effect may be displayed on the content display area 905. If the alternative process resumes, a message to that effect may be displayed on the content display area 905.

The data acquisition in HTTP may be initiated not only by the GET request but also by the POST request (in this case, as well, the server returns the form of data and the data in response).

The dialog window, querying the user about how to handle the undisplayable data, shown in step S1305 is now described with reference to FIG. 14. FIG. 14 illustrates the dialog window querying the user about how to handle the undisplayable data, displayed in step S1305.

The dialog window querying the user about how to handle the undisplayable data, displayed in step S1305 notifies the user that the data currently being acquired by the browser is undisplayable. The dialog window further notifies the user of the data format, and displays buttons for selecting the alternative processes, namely, "print", "send", and "cancel" processes. If the "print" button or "send" button is selected, a shifting operation to each alternative process starts. If the "cancel" button is selected, the data currently being acquired is discarded, and the connection is closed.

In this window, a "store" button may be displayed to acquire the data first for later processing.

Figure 15:
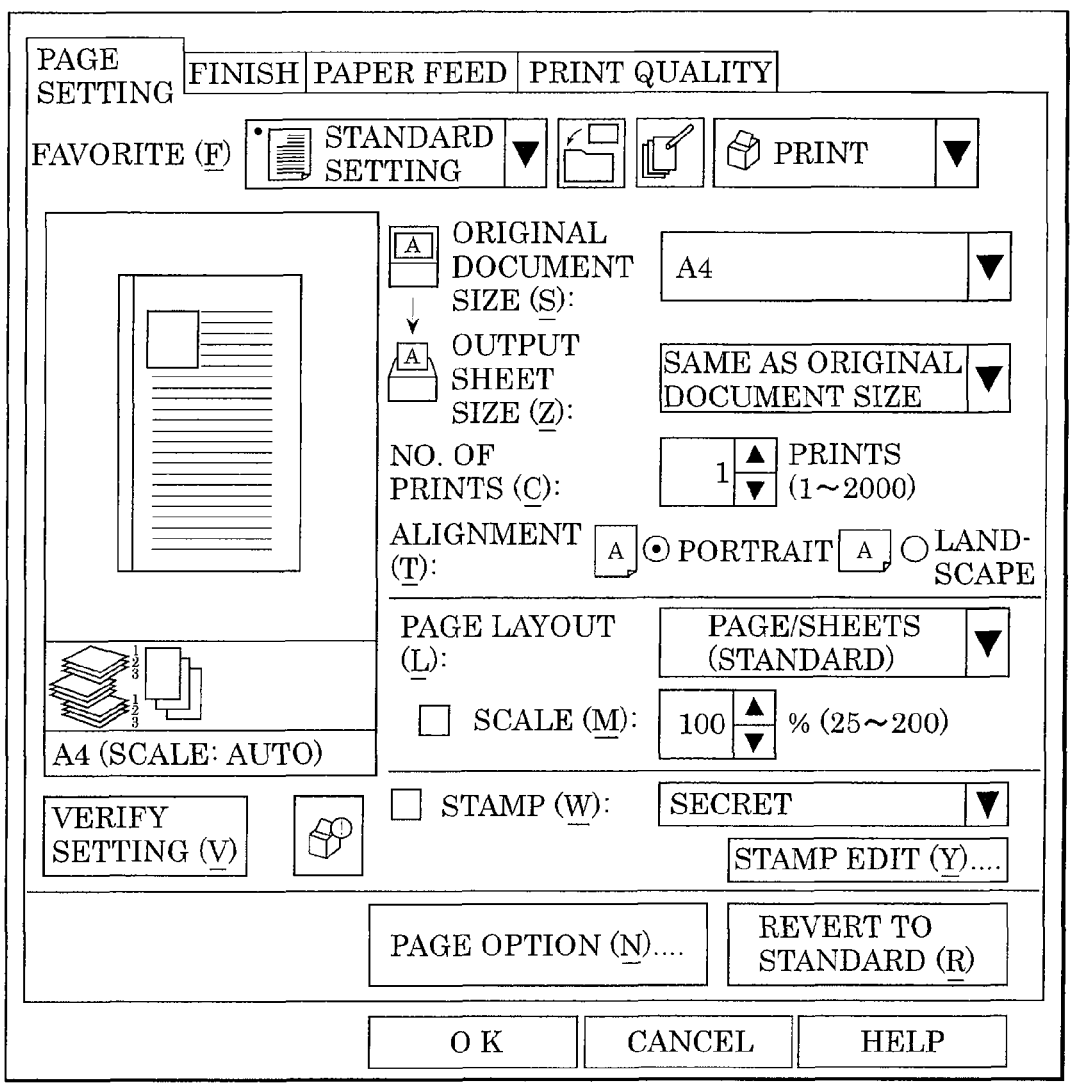
FIG. 15 illustrates a dialog window that interacts with the user to initiate a print function as an alternative process in accordance with the first exemplary embodiment of the present invention.

If the "print" button is selected on the dialog window of FIG. 14, a dialog window that interacts with the user to initiate the print function as an alternative process appears as shown in FIG. 15. That dialog window, presented to the user in step S1307 in FIG. 13, shows setting items for web pull-print function, and setting items more like those for the printer driver for initiating a print job on a desktop computer. More specifically, the dialog window shows panes grouped into "page setting", "finish", "paper feed", and "print quality" so that operational parameters of the print job are set in detail. If the "OK" button is selected, the setting is validated, and the acquired data is printed. If the "cancel" button is selected, the data currently being acquired is discarded and the connection is closed, although this process is not shown in FIG. 13.

If the "send" button is selected on the dialog window of FIG. 14, a dialog window that interacts with the user to initiate the send function as an alternative process appears. That dialog window is displayed in step S1310 of FIG. 13. If a start button is selected on the dialog window, the setting is validated, and the send process for sending the acquired data to a set destination in a designated sending method is initiated.

If the "send" button is selected, a main dialog window 3200 that interacts with the user to initiate the send function as an alternative process appears. The main dialog window 3200 of FIG. 16 includes a destination display area 3202, a detailed destination count display area 3203, a destination scroll button 3204, an address button 3208, a new entry button 3209, an edit button 3210, a delete button 3211, a subject input area 3205, a message input area 3206, a file name input area 3207, a cover page input button 3212, an HD write check button 3213, a print output check button 3214, and a scan setting button 3215.

The destination display area 3202 shows a list of input destinations. A new input is successively added to the bottom line of the list. The detailed destination count display area 3203 shows the current count of destinations. If the delete button 3211 is selected after any given destination is selected from the destination display area 3202, the selected destination is deleted. If one of the subject input area 3205, the message input area 3206, and the file name input area 3207 is selected, the full keyboard appears permitting the user to enter a corresponding input.

Figure 17:
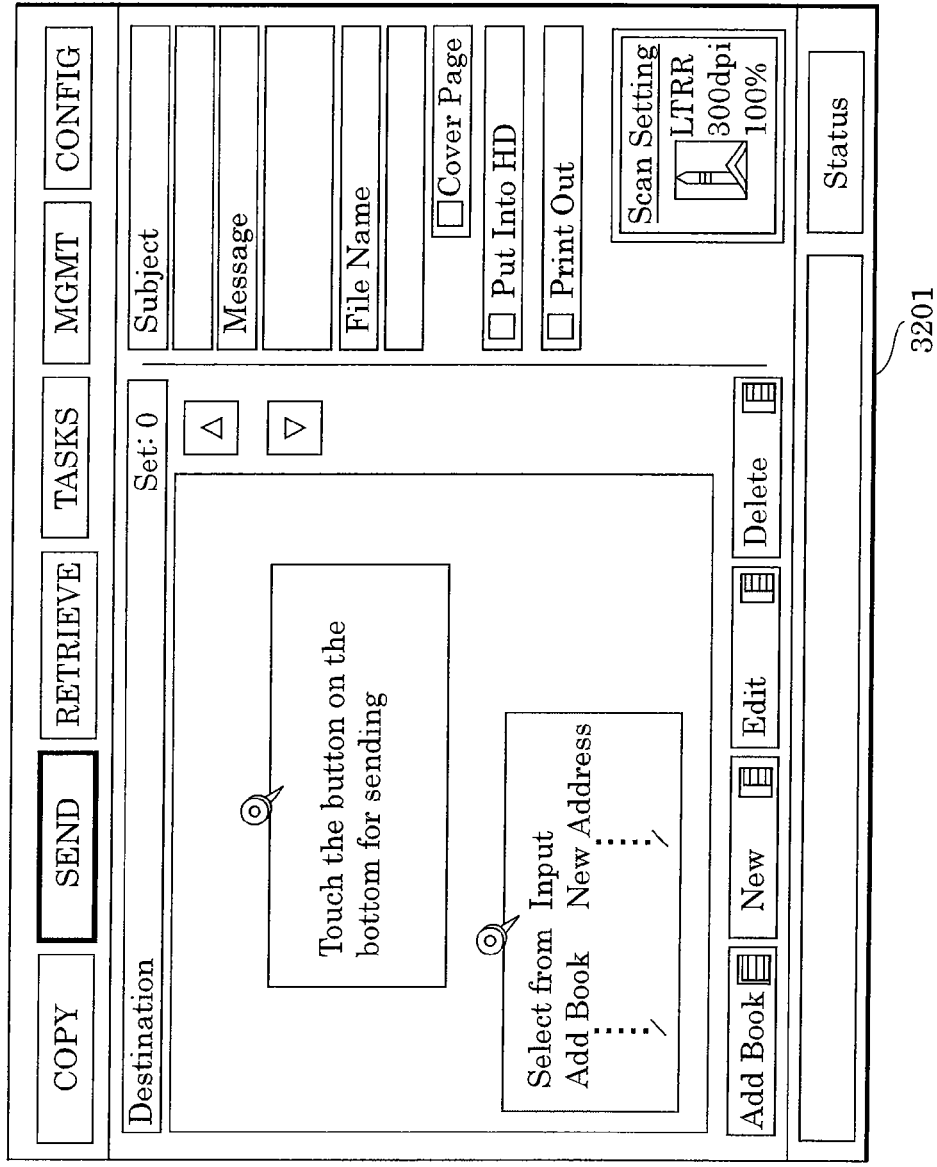
FIG. 17 illustrates the initial state of the main dialog window that interacts with the user to initiate the sending function as an alternative process in accordance with the first exemplary embodiment of the present invention.

The main window 3200 at the default state thereof is shown as a window 3201 of FIG. 17. In the main window 3200 at the default state thereof, no destination is shown in the destination display area 3202, and an operation guide screen is shown instead.

Figure 16:
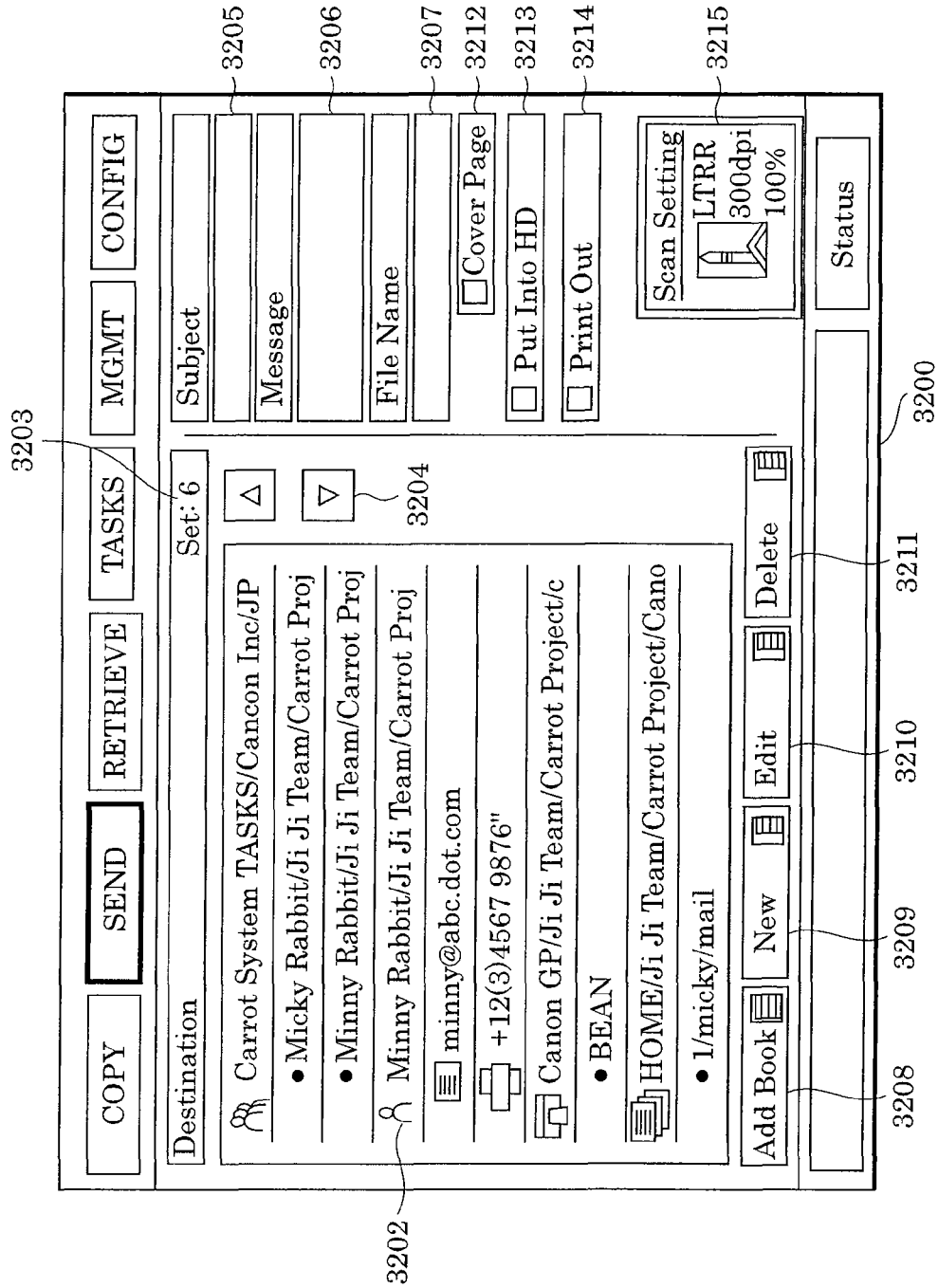
FIG. 16 illustrates a main dialog window that interacts with the user to initiate a sending function as an alternative process in accordance with the first exemplary embodiment of the present invention.
Figure 18:
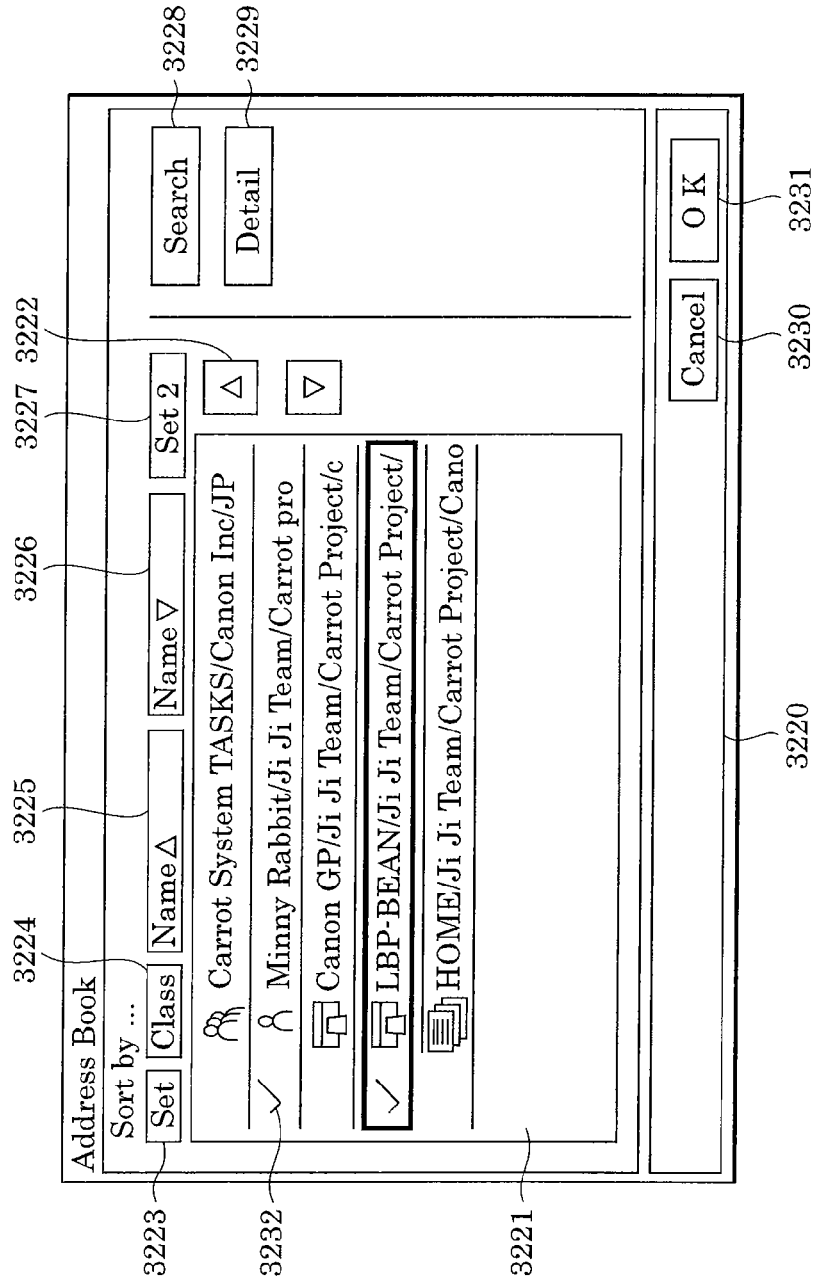
FIG. 18 illustrates an address book subwindow that is opened to set the sending function as an alternative process in accordance with the first exemplary embodiment of the present invention.

When an address book button 3208 is selected on the main window 3202 of FIG. 16, an address book subwindow 3220 appears as shown in FIG. 18. The address book subwindow 3220 includes an address book display area 3221, sort item setting buttons 3224-3226, a selected item count display area 3227, a search button 3228, a detail button 3229, a cancel button 3230, and an OK button 3231.

The address book display area 3221 shows destinations. A destination with a selection mark 3232 attached thereto, out of the displayed destinations, is added to the destination display area 3202 of the main window 3200 when the OK button 3231 is selected. The address book is shown with the addresses sorted according to classes, in the ascending order of names, or the descending order of names by selecting the sort item setting buttons 3224-3226, respectively. The selected item count display area 3227 shows the number of items with the selection mark attached thereto. If one of the OK button 3231 and the cancel button 3230 is selected, the address book subwindow 3220 is closed, and the main window 3200 is displayed instead.

Figure 19:
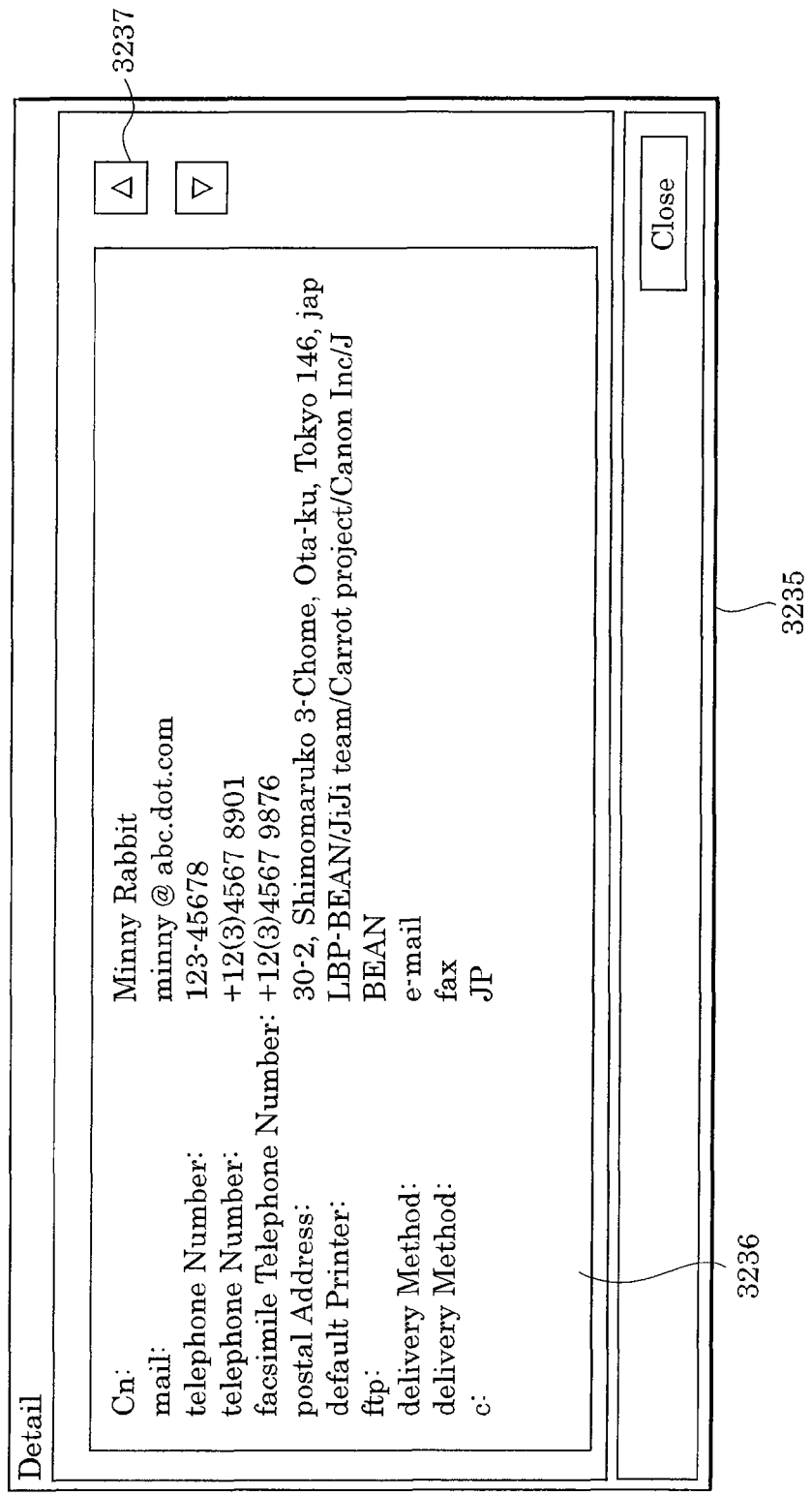
FIG. 19 illustrates a detailed address book detail subwindow that is opened to set the sending function as an alternative process in accordance with the first exemplary embodiment of the present invention.

If the detail button 3229 is selected with one of the addresses in the address book selected, a detailed subscreen 3235 of FIG. 19 appears. All information available from the address book relating to the selected item is displayed in a display area 3236 of the detailed subscreen 3235. The information displayed in the display area 3236 can be scrolled by scroll buttons 3237.

In accordance with the first exemplary embodiment, the multi-function apparatus uses the multi-functions unique thereto, including the print function and the send function, as the alternative functions when the multi-function apparatus having the web browser acquires undisplayable data. Using the web browser having the basic function only, the apparatus can take advantage of a variety of content on the Internet. In the Internet or intranet that is organically arranged using mutual references based on web hypertext, the browser searches for and selects data scattered over the network, and uses the data with the function of the multi-function apparatus. For example, a great deal of content including manuals, catalogs, and news releases, are already managed and open to the public on a web base in the Internet. A stand-alone multi-function apparatus can easily perform the printing and sending of the content.

Groupware and workflow management systems are widely used in intranets. Some content, such as predetermined documentary forms or notices, are undisplayable by a built-in browser, but still worth printing and sending for mutual referencing. Such content is scattered and accumulated in the intranet. In particular, directly printable PDF data is easily printed by not only already realized mechanisms, such as reference print from a remote UI or a web print, but also a single multi-function apparatus using the operation panel thereof.

Contents open to the public on a web base cannot be conveyed to a user unless the user actively browses and pulls the contents. The user easily performs a series of steps pulling (acquiring) a web document and pushing (sending) the web document to a desired destination using an operation panel of a multi-function apparatus having many functions. For example, the user thus includes a reliable web sending process in a conventional workflow of periodical transmission of paper documents.

Second Exemplary Embodiment

Figure 20:
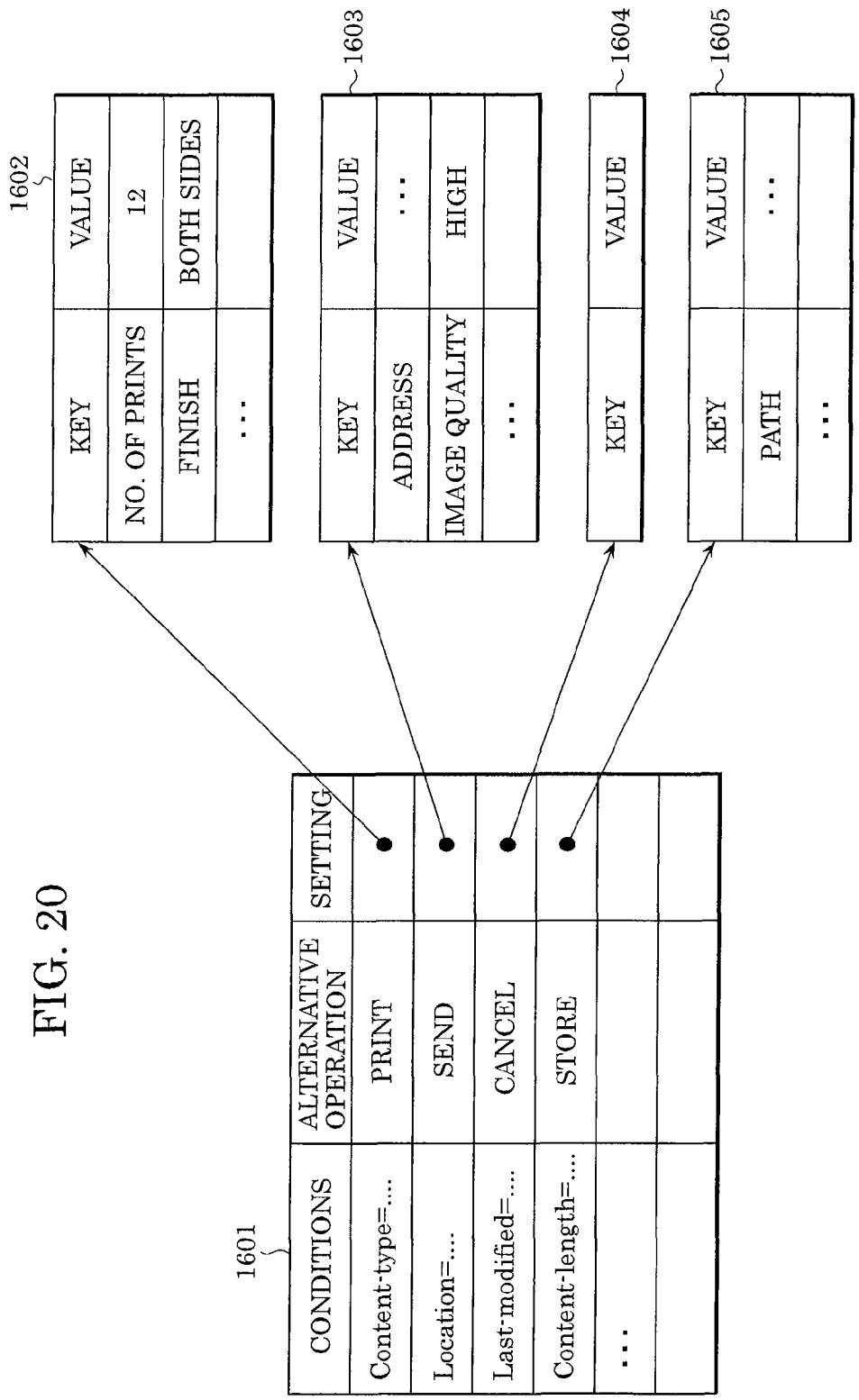
FIG. 20 illustrates the structure of a table, for automatically entering an alternative process and the setting thereof, held in a multi-function apparatus in accordance with a second exemplary embodiment of the present invention.

A second exemplary embodiment of the present invention is described below with reference to FIG. 20. FIG. 20 diagrammatically illustrates the structure of a table 1601 of alternative processes and automatic setting thereof held in a multi-function apparatus in accordance with the second exemplary embodiment of the present invention.

If data received by the image processing apparatus 110 is undisplayable, the manner of handling the undisplayable data is determined by referencing the table 1601 of FIG. 20.

The table 1601 is used to automate the alternative process setting with the interaction with the user performed in step S1305 of FIG. 13 skipped. As shown in FIG. 20, the alternative process is described on the data in accordance with the conditions of the acquired data. A "conditions" column of the table lists conditions of acquired data. The conditions of the acquired data refer to the attributes of the data detectable according protocol, such as the format of the data, the source of the data (a server and a file name), the size of the data, and update time of the data. The conditions of the acquired data are those that are compared in pattern matching. For example, the content-type and the URL of the source are pattern matched in regular expression with the attributes of the acquired data. As a content length is arithmetically compared with the attributes of the data. A combination of a plurality of these conditions may be described.

If the conditions of the acquired data match, an action (process) described in an "alternative" column is automatically performed. The action means a process, such as print, send, or store that the apparatus can perform on the data. A "setting" column holds a reference value to property data describing operational setting to the alternative process corresponding to each action.

The operational setting to the "print" action is represented by property data 1602. The operational setting to the "send" action is represented by property data 1603. The operational setting to the "cancel" action is represented by property data 1604. The operational setting to the "store" action is represented by property data 1605. The property data is described by a combination of a key and the value of the key. A series of keys and values thereof are parameters of the alternative processes. By setting the property data, the interactions with the user in steps S1307 and S1310 of FIG. 13 are skipped. The alternative process response to the acquired data is automatically performed.

The CPU 301 of the controller 111 can set process conditions into the table 1601 in each of the plurality of alternative processes ("print", "send", "store" and so on). In "print", the CPU 301 can set, into the table 1601, a paper type, size type, etc., to be used in the case of printing the acquired data by the printer 114, the number of copies to be printed, whether or not to print on both sides of the paper, and so on. In the case where the printer includes a staple unit performing a staple process to a plurality of papers, it can be set of the position on the paper where the staple process should be done. In the case where the printer includes a plurality of paper discharge trays for carrying discharged papers from the printer, the CPU 301 can set into the table 1601 the setting of which tray the papers should be discharged.

Further, the CPU 301 can set the arrangement direction of the acquired data to the paper to be printed, or can set whether to perform a monochrome print or a color print in the case where the printer includes a function of color printing. Further, in the case of printing the acquired data in a monochrome, the CPU 301 can set the print quality including the grayscale.

Further, in "send", the CPU 301 can set the quality (resolution, coding method etc.), a data type, and an image orientation for the acquired data to be sent when the acquired data is to be sent to an external device via the network I/F 308 or the modem 309. Further, the CPU 301 can set whether to send the color type of the acquired data as is or to convert the color data to a grayscale data of monochrome and send the grayscale data. Further, the CPU 301 can set a destination (E-mail address, IP address, etc.) for sending to an external device via the network I/F 308 or the modem 309.

Further, in "store", the CPU 301 can set the image quality (resolution, coding method, etc.), a data type, and an image orientation for the acquired data to be stored for storing the acquired data into the HDD 304. Further, the CPU 301 can set whether to store the color type of the acquired data as is or to convert it to monochrome data including grayscale and store the converted data. Further, the CPU 301 can set a storage location (a folder in the store location) for storing the acquired data into the HDD 304.

A rule for automatically performing the action of the alternative process in response to the conditions of the acquired data can be set by the user. For example, for a user who finds a description in the regular expression difficult to set, a front-end processing module may be provided. The front-end processing module generates a regular expression receiving a more natural expression, such as "process starting with . . . ", "process containing . . . ", "process ending with . . . ". A multi-function apparatus that identifies or authenticates the user may hold a set of rules unique to each user.

In accordance with the second exemplary embodiment, the following advantages are provided in addition to those of the first exemplary embodiment.

A routine workflow, such as downloading a disclosed content with the web technique, printing the content, and sending the content, is semi-automated by user customizing the process. For example, a semi-automated process is achieved in which a printout is obtained by simply clicking a link of a PDF document on the browser representing an index document in HTML. If contents stored at a given location (a server or a path) have a standard format (or manual), the standard format for both side printing (or the manual) is printed by simply clicking a link on the browser displaying an index HTML document in another semi-automated process. If contents placed in another location is a notice, the notice is sent to all related members in a semi-automated process by simply clicking the content on the browser.

In each of the above-described embodiments, an automatic acquisition mechanism of acquiring contents on schedule is arranged in the web browser in each of the image processing apparatuses 110, 120, and 130. In synchronization with calendar or timer, a plurality of designated URLs are automatically cycled through to automatically acquire updated content on a designated date, on a designated day of the week, or at a designated time. In accordance with an event, such as the startup of each of the image processing apparatuses 110, 120, and 130, automatic content acquisition may be performed from a designated location. The description of the designated location can contain an indirection. For example, all contents indirectly referenced by a link from the directly designated HTML document can be automatically acquired. The scheduling of the automatic acquisition mechanism can be set by the user. With the automatic acquisition mechanism employed, a routine workflow can be fully automated by combining the conditions of the acquired data and the rule of the action in accordance with the second exemplary embodiment.

The information processing apparatus of the second exemplary embodiment determines the manner of handling the undisplayable data referencing the table 1601 of FIG. 20 if the received data is undisplayable. Alternatively, regardless of whether or not the received data can be displayed, the information processing apparatus selects one process from a plurality of processes (such as the print process, the send process, and the store process) executable based on the attributes of the data. In this case, a process condition applied to the selected process may be set as listed in the table of FIG. 20. The information processing apparatus thus constructed automatically performs a desired process under a desired process condition based on the attributes of the received data. For example, if the attributes of the data indicate a PDF document, a print process is performed under the process condition of both side printing. The user's routine workflow is fully automated.

A storage medium storing program code of the software program performing the functions of the embodiments of the present invention is installed in a system or an apparatus, and a computer (CPU or MPU (micro-processing unit)) of the system or the apparatus reads and executes the program code stored in the storage medium. The program code read from the storage medium performs the functions of the foregoing embodiments of the present invention. By executing the program code read by the computer, the functions of the foregoing embodiments are performed. Furthermore, the operating system (OS) running on the computer performs partly or entirely a process in response to the instructions of the program code, and with the process performed, the functions of the above-referenced embodiments are performed.

The program code read from the storage medium can be read into a memory incorporated in a feature expansion board in the computer or in a feature expansion unit connected to the computer. The CPU mounted on the feature expansion board or the feature expansion unit performs partly or entirely the actual process in response to the instructions from the program code. The functions of the above embodiments are executed through the process.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus including at least one processor for communicating with a server on a network, the image processing apparatus comprising:
   a transmitting unit that transmits an acquisition request to the server, the acquisition request being for requesting the server to transmit data stored in the server to the image processing apparatus;
   a receiver unit that receives the data transmitted from the server in response to the acquisition request transmitted by the transmitting unit;
   a display unit that performs a display process based on the data received by the receiver unit;
   an image forming unit that performs an image forming process for forming an image on a sheet based on the data received by the receiver unit;
   a determining unit that determines, whether the data received by the receiver unit is un-displayable data that cannot be displayed by the display unit based on a format of the data received by the receiver unit;
   a selector unit, if it is determined that the received data is un-displayable data, the selector unit selects the image forming process as a selecting item in a case where the image forming unit can perform the image forming process based on the data received by the receiver unit and, if it is determined that the received data is un-displayable data, the selector unit selects alternative process not including the image forming process as a selecting item in a case where the image forming unit cannot perform the image forming process based on the data received by the receiver unit; and
   a control unit that performs the process selected by the selector unit based on the un-displayable data.

2. The image processing apparatus according to claim 1, further comprising:
   a storage unit that stores the data received by the receiver unit,
   wherein the alternative process is a storage process for storing the data received by the receiver unit in the storage unit.

3. The image processing apparatus according to claim 1, wherein the transmitting unit performs a transmitting process for transmitting the data received by the receiver unit to a predetermined destination on the network, and
   wherein the alternative process is the transmitting process performed by the transmitting unit.

4. The image processing apparatus according to claim 1, wherein the display unit displays a plurality of display sections corresponding to the alternative process if the determining unit determines that the data received by the receiver unit is un-displayable data, and wherein the selector unit selects the alternative process corresponding to a display section designated by a user on the display unit.

5. The image processing apparatus according to claim 1, further comprising:
a setting unit that sets a process condition of the alternative process selected by the selector unit,
wherein the control unit performs the alternative process selected by the selector unit based on the process condition set by the setting unit.

6. The image processing apparatus according to claim 1,
wherein the display unit displays a screen based on a structural document received from the server, and
wherein the transmitting unit transmits the acquisition request in response to a designation of a predetermined display area of the screen displayed on the display unit.

7. The image processing apparatus according to claim 6,
wherein the structural document is a hypertext markup language document, and
wherein the receiver unit receives the data from the server using a hypertext transfer protocol.

8. An image processing apparatus including at least one processor for communicating with a server on a network, the image processing apparatus comprising:
a transmitting unit that transmits an acquisition request to the server and to perform a transmitting process for transmitting data in a predetermined format to a predetermined destination on the network, the acquisition request being for requesting the server to transmit data stored in the server to the image processing apparatus;
a receiver unit that receives the data transmitted from the server in response to the acquisition request transmitted by the transmitting unit;
a display unit that performs a display process based on the data received by the receiver unit;
a determining unit that determines, whether the data received by the receiver unit is un-displayable data that cannot be displayed by the display unit, based on a format of the data received by the receiver unit;
a selector unit, if it is determined that the received data is un-displayable data, the selector unit selects the transmitting process as a selecting item in a case where the format of the received data is the predetermined format and to, if it is determined that the received data is un-displayable data, the selector unit selects alternative process not including the transmitting process as a selecting item in a case where the format of the received data is not the predetermined format; and
a control unit that performs the process selected by the selector unit based on the un-displayable data.

9. The image processing apparatus according to claim 8, further comprising:
a storage unit that stores the data received by the receiver unit,
wherein the alternative process is a storage process for storing the data received by the receiver unit in the storage unit.

10. The image processing apparatus according to claim 8, further comprising:
an image forming unit that performs an image forming process for forming an image on a sheet based on the data received by the receiver unit,
wherein the alternative process is the image forming process performed by the image forming unit.

11. The image processing apparatus according to claim 8, wherein the display unit displays a plurality of display sections corresponding to the alternative processes if the determining unit determines that the data received by the receiver unit is un-displayable data, and
wherein the selector unit selects one of the alternative processes corresponding to a display section designated by a user on the display unit.

12. The image processing apparatus according to claim 8, further comprising:
a setting unit that sets a process condition of the alternative process selected by the selector unit,
wherein the control unit performs the alternative process selected by the selector unit based on the process condition set by the setting unit.

13. The image processing apparatus according to claim 8,
wherein the display unit displays a screen based on a structural document received from the server, and
wherein the transmitting unit transmits the acquisition request in response to a designation of a predetermined display area of the screen displayed on the display unit.

14. The image processing apparatus according to claim 13,
wherein the structural document is a hypertext markup language document, and
wherein the receiver unit receives the data from the server using a hypertext transfer protocol.

15. An image processing method for an image processing apparatus including an image forming unit to communicate with a server on a network, the image processing method comprising:
transmitting an acquisition request to the server, the acquisition request being for requesting the server to transmit data stored in the server to the image processing apparatus;
receiving the data transmitted from the server in response to the acquisition request;
performing a display process based on the data received;
performing an image forming process for forming an image on a sheet based on the data received;
determining, whether the data received is un-displayable data that cannot be displayed by a display unit, based on a format of the data received;
if it is determined that the received data is un-displayable data, selecting the image forming process as a selecting item in a case where the image forming unit can perform the image forming process based on the data received;
if it is determined that the received data is un-displayable data, selecting alternative process not including the image forming process as a selecting item in a case where the image forming unit cannot perform the image forming process based on the data received; and
performing the process selected based on the un-displayable data.

16. An image processing method for an image processing apparatus to communicate with a server on a network, the image processing method comprising:
transmitting an acquisition request to the server and performing a transmitting process for transmitting data in a predetermined format to a predetermined destination on the network, the acquisition request being for requesting the server to transmit data stored in the server to the image processing apparatus;
receiving the data transmitted from the server in response to the acquisition request;
performing a display process based on the data received;
determining, whether the data received is un-displayable data that cannot be displayed by a display unit, based on a format of the data received;

if it is determined that the received data is un-displayable data, selecting the transmitting process as a selecting item in a case where the format of the received data is the predetermined format;

if it is determined that the received data is un-displayable data, selecting alternative process not including the transmitting process as a selecting item in a case where the format of the received data is not the predetermined format; and performing the process selected based on the un-displayable data.

17. A non-transitory computer-readable medium having stored thereon computer-executable instructions for an image processing apparatus including an image forming unit to execute for communicating with a server on a network, the computer-executable instructions comprising instructions for:

transmitting an acquisition request to the server, the acquisition request being for requesting the server to transmit data stored in the server to the image processing apparatus;

receiving the data transmitted from the server in response to the acquisition request;

performing a display process based on the data received;

performing an image forming process for forming an image on a sheet based on the data received;

determining, whether the data received is un-displayable data that cannot be displayed by a display unit, based on a format of the data received;

if it is determined that the received data is un-displayable data, selecting the image forming process as a selecting item in a case where the image forming unit can perform the image forming process based on the data received;

if it is determined that the received data is un-displayable data, selecting alternative process not including the image forming process as a selecting item in a case where the image forming unit cannot perform the image forming process based on the data received; and performing the process selected based on the un-displayable data.

18. A non-transitory computer-readable medium having stored thereon computer-executable instructions for an image processing apparatus to execute for communicating with a server on a network, the computer-executable instructions comprising instructions for:

transmitting an acquisition request to the server and performing a transmitting process for transmitting data in a predetermined format to a predetermined destination on the network, the acquisition request being for requesting the server to transmit data stored in the server to the image processing apparatus;

receiving the data transmitted from the server in response to the acquisition request;

performing a display process based on the data received;

determining, whether the data received is un-displayable data that cannot be displayed by a display unit, based on a format of the data received;

if it is determined that the received data is un-displayable data, selecting the transmitting process as a selecting item in a case where the format of the received data is the predetermined format;

if it is determined that the received data is un-displayable data, selecting alternative process not including the transmitting process as a selecting item in a case where the format of the received data is not the predetermined format; and performing the process selected based on the un-displayable data.

\* \* \* \* \*